United States Patent
Zhang et al.

(10) Patent No.: US 11,954,114 B2
(45) Date of Patent: Apr. 9, 2024

(54) SYSTEMS AND METHODS FOR IMPROVED BLOCKCHAIN DATA INDEXING BY DECOUPLING COMPUTE AND STORAGE LAYERS

(71) Applicant: Coinbase, Inc., Oakland, CA (US)

(72) Inventors: Jie Zhang, Oakland, CA (US); Zhicong Liang, Oakland, CA (US); Yaohua Yang, Oakland, CA (US); David Lai, Oakland, CA (US); Chaoqing Lu, Oakland, CA (US); Jinghan Xu, Oakland, CA (US); Xu Meng, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 29 days.

(21) Appl. No.: 17/810,040

(22) Filed: Jun. 30, 2022

(65) Prior Publication Data
US 2024/0004894 A1    Jan. 4, 2024

(51) Int. Cl.
G06F 16/25 (2019.01)
G06F 16/178 (2019.01)
G06F 16/27 (2019.01)

(52) U.S. Cl.
CPC ........ *G06F 16/258* (2019.01); *G06F 16/1794* (2019.01); *G06F 16/27* (2019.01); *G06F 16/273* (2019.01); *G06F 16/275* (2019.01); *G06F 16/278* (2019.01)

(58) Field of Classification Search
CPC .... G06F 16/258; G06F 16/27; G06F 16/1794; G06F 16/273; G06F 16/275; G06F 16/278
See application file for complete search history.

(56) References Cited

U.S. PATENT DOCUMENTS

| | | | | |
|---|---|---|---|---|
| 2019/0179861 | A1* | 6/2019 | Goldenstein | G06F 16/367 |
| 2019/0279172 | A1* | 9/2019 | Duffield | H04L 9/3247 |
| 2019/0387105 | A1* | 12/2019 | Jackson | H04L 12/1403 |
| 2021/0357188 | A1* | 11/2021 | Bayless | G06F 8/447 |

* cited by examiner

*Primary Examiner* — Kris E Mackes
*Assistant Examiner* — Lin Lin M Htay
(74) *Attorney, Agent, or Firm* — Perkins Coie LLP

(57) ABSTRACT

Systems and methods for a unified approach that is compatible with all blockchains, protocols, etc. The systems and methods use a bifurcated indexing system with a dynamically selected application service. The systems and methods bifurcate the indexing process into a storage layer and a compute layer.

20 Claims, 11 Drawing Sheets

SYSTEMS AND METHODS FOR IMPROVED BLOCKCHAIN DATA INDEXING BY DECOUPLING COMPUTE AND STORAGE LAYERS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

The use of blockchain technology and applications that rely on blockchain technology has grown exponentially. To use blockchain data, an application often needs to index the blockchain data. Given the decentralized nature of the blockchain, a typical approach is to extract the relevant data from the blockchain itself and then organize and/or distribute the data according to the needs of the application. As there is no common platform for indexing the data, the same process is repeated over and over again for each new application being created or on-boarded to an existing application ecosystem.

Developing a common platform faces numerous technical hurdles. First, blockchain data is constantly changing as new chains and protocols are developed. As such, any common platform would need to be compatible with these new chains and protocols. Second, any common platform would need to be able to handle chain reorganizations. For example, while blocks in a blockchain may be immutable, what forks in the blockchain is canonical may change.

These problems are exacerbated by the underlying data availability issues of the blockchain. Specifically, archival nodes with a complete state of the blockchain are expensive to operate and data extraction from a node on an ad hoc basis is unreliable and slow. Conventional approaches for data management in other technical fields are also not effective. For example, in a conventional distributed computing system (i.e., non-blockchain system), a system may distribute processing tasks between a pool of load-balanced nodes (e.g., in a master-slave arrangement) with the system maintaining continuity between the results of each task. However, blockchain nodes are fundamentally different because the nodes act in a master-to-master arrangement with their states maintaining consistency with the blockchain.

In view of these technical problems, aspects are described herein for improvements to blockchain technology, and in particular, indexing blockchain data using a bifurcated indexing system with a dynamic compute engine.

For example, one technical problem to overcome related to indexing blockchain data is that the data sources are constantly changing (e.g., forks may develop in existing blockchain, new protocols and blockchains are being created, etc.). As such, any standardized indexing schema is only able to handle current fields. If a new field is needed (e.g., based on a new protocol, blockchain, etc.), then the entire blockchain index must be redone.

In view of this, the system and methods provide for a unified approach that is compatible with all blockchains, protocols, etc. To accomplish this, the systems and methods use a bifurcated indexing system with a dynamically selected application service. Specifically, as opposed to conventional indexing, the systems and methods bifurcate the indexing process into a storage layer and a compute layer. By doing so, the system may modify any processing schema (e.g., what data format is used, what compute engine is used, etc.) without affecting a storage schema. For example, the systems and methods decouple the storage system from the compute system, which allows the storage system to scale out (or up) as dictated by the workload. Furthermore, the system may use a storage schema that stores data as files with predefined formats and at different granularity levels (e.g., in a blockchain-interface layer and a data lakehouse layer). By doing so, the systems and methods enable other layers, for example, the application service layer of the indexing application to choose the most appropriate data format (e.g., use a data format and compute engine that is best suited for the task) for processing the stored data. As an additional technical benefit, the systems and methods allow for different processing layers to be used (e.g., select a specific application service layer based on a given task) as well as multiple storage layers based on a given task (e.g., a blockchain-interface layer comprising raw blockchain data, a data lakehouse layer comprising a set of cleansed data, etc.).

In some aspects, systems and methods for improved blockchain data indexing by decoupling compute and storage layers are described. For example, the system may receive, at a blockchain-interface layer, first on-chain data from a blockchain node of a blockchain network, wherein the first on-chain data comprises hexadecimal encoded data from a first block of the blockchain network, wherein the blockchain-interface layer transforms the first on-chain data to a first format, using a first compute engine, for storage in a first dataset, and wherein the first format comprises data types with field names identified by a respective integer. The system may receive, at a data lakehouse layer, the first on-chain data in the first format, wherein the data lakehouse layer transforms the first on-chain data to a second format, using a second compute engine, for storage in a second dataset, wherein the second format comprises a columnar oriented format, wherein the second dataset comprises the first on-chain data and second on-chain data, and wherein the second on-chain data is from a second block on the blockchain network. The system may determine an application characteristic for an application that performs blockchain operations using the first on-chain data or the second on-chain data. The system may receive, at an application service layer, the first on-chain data and the second on-chain data in the second format, wherein the application service layer transforms, using a third compute engine, the first on-chain data and the second on-chain data to a third format for storage in a third dataset, and wherein the third format is dynamically selected based on the application characteristic. The system may transmit the first on-chain data and the second on-chain data in the third format to the application.

In further view of the technical problems cited above, aspects are described herein for improvements to blockchain technology, and in particular, indexing blockchain data using blockchain node balancing.

For example, one technical hurdle to indexing blockchain data is how to extract data from the node efficiently. One naïve approach would be querying from a single node, thereby eliminating the need to deal with chain reorganization or inconsistent states between the nodes. However, this approach is bottlenecked by the limited throughput of a single node. On the other hand, if blocks are queried from a pool of load-balanced nodes, potentially inconsistent states between the nodes would have to be resolved (e.g., requiring the system to introduce a consensus algorithm to resolve the potentially inconsistent states).

In view of this, the systems and methods provide for a novel blockchain node balancing approach using sticky master nodes. For example, the systems and methods may first select a plurality of nodes comprising designated master nodes and slave nodes. The system uses the master nodes to query the information as to what blocks are on the canonical chains. The system then enables a sticky session while reading from the master nodes so that the queries are served by the same node (and fall back to a different node when the previous one goes unhealthy). To improve the efficiency and speed of the query, the system may use batch application programming interfaces (APIs) to query a range of blocks, without requesting the full transaction objects. Once the block identifiers on the canonical chain are resolved from the master nodes, the full blocks are extracted in parallel, and/or out of order from the slave nodes, which are backed by a pool of load-balanced nodes.

In some aspects, systems and methods for improved blockchain data indexing by avoiding throughput bottlenecks caused by reliance on a single blockchain node are described. For example, the system may designate a first blockchain node of a plurality of blockchain nodes for a blockchain network as having a first node type. The system may, based on designating the first blockchain node of the plurality of blockchain nodes as having the first node type, establish a session with the first blockchain node. While maintaining the session, the system may determine an order of a first block and a second block on a canonical chain of the blockchain network, designate a second blockchain node and a third blockchain node of the plurality of blockchain nodes as having a second node type, based on designating the second blockchain node and the third blockchain node of the plurality of blockchain nodes as having the second node type, transmit, in parallel, queries to the second blockchain node and the third blockchain node for first on-chain data from the first block and second on-chain data from the second block, respectively, and/or receive the first on-chain data or the second on-chain data. In response to receiving the first on-chain data or the second on-chain data, the system may index, in a first dataset, the first on-chain data or the second on-chain data based on the order of the first block and the second block on the canonical chain.

In further view of the technical problems cited above, aspects are described for improvements to blockchain technology, and in particular providing reorganization immunity.

One technical hurdle in designing an indexing application is how to handle blockchain reorganizations. For example, although the blocks themselves are immutable in the blockchain, what constitutes the canonical chain could change due to a chain reorganization.

In view of this, the system and methods create a reorganization-immune blockchain index using mono-increasing sequence records. For example, instead of overwriting a stored dataset (e.g., in a storage layer) when a change is seen, the system models changes as a strictly ordered sequence of added (+) or removed (−) events, with each event associated with a mono-increasing sequence number. Notably, such a management of sequences is unnecessary for normal blockchain data as the data in the blocks (e.g., events) themselves are immutable and thus, there would be little need for determining this information and appending this information to a dataset of indexed blockchain data. By doing so, the system may implement change-data-capture patterns across the events. For example, the system may reconstruct a canonical chain (e.g., following a reorganization) by grouping the events by height and taking the item with the largest sequence number from each group.

In some aspects, systems and methods for creating a reorganization-immune blockchain index using mono-increasing sequence records are described. For example, the system may receive on-chain data for a plurality of blocks, wherein the plurality of blocks comprises a first block comprising a first event of a plurality of blockchain events within the on-chain data. The system may determine a first sequence number for the first event. The system may determine a first chain height for the first block. The system may detect a blockchain network reorganization. In response to the blockchain network reorganization, the system may determine whether the first sequence number corresponds to a highest sequence number among respective sequence numbers for the plurality of blocks that have the first chain height, determine that the first block corresponds to a canonical chain for a blockchain network based on determining that the first sequence number corresponds to the highest sequence number among respective sequence numbers for the plurality of blocks that have the first chain height, and/or update a blockchain index to indicate that the first block corresponds to the canonical chain.

In further view of the technical problems cited above, aspects are described herein for improvements to blockchain technology, and in particular to improving the processing speed of raw blockchain data.

For example, even if improvements to retrieving blockchain data from a blockchain node and storing blockchain data in a reorganization-immune blockchain index are achieved, indexing applications still face a technical hurdle to interfacing with legacy (e.g., non-blockchain based) systems. For example, building legacy applications on top of raw blockchain datasets is a tedious process, as the raw blockchain datasets need to support both batch processing and streaming data applications, load and process data incrementally, and provide a near-constantly materialized dataset.

In view of this, the system and methods cleanse raw blockchain data into an append-only delta table that may be accessed by legacy applications. For example, as new raw blockchain data is received, the system and methods model the data stream as an unbounded, continuously updated table. By doing so, as new data is made available in the input data stream, one or more rows are appended to the unbounded table as a micro batch. From the perspective of downstream applications, the query on this conceptual input table can be defined as if it were a static table. As such, the append-only delta table supports both batch processing and streaming data applications, enables data to be loaded and processed incrementally, and provides a near-constantly materialized dataset.

In some aspects, systems and methods for supporting both batch processing and streaming data applications, to load and process data incrementally, while providing a near-constantly materialized dataset based on raw blockchain data, are described. For example, the system may receive, at a data lakehouse layer, first on-chain data in a first format via a first input stream, wherein the first on-chain data originates from a blockchain node of a blockchain network. The system may transform the first on-chain data to a second format for storage in a second dataset, wherein the second format comprises an unbounded table, and wherein transforming the first on-chain data to the second format comprises: detecting first new on-chain data in the first input stream; appending the first new on-chain data to the unbounded table as a micro batch; and storing the first new on-chain data in the second dataset. The system may generate an output based on the second dataset.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
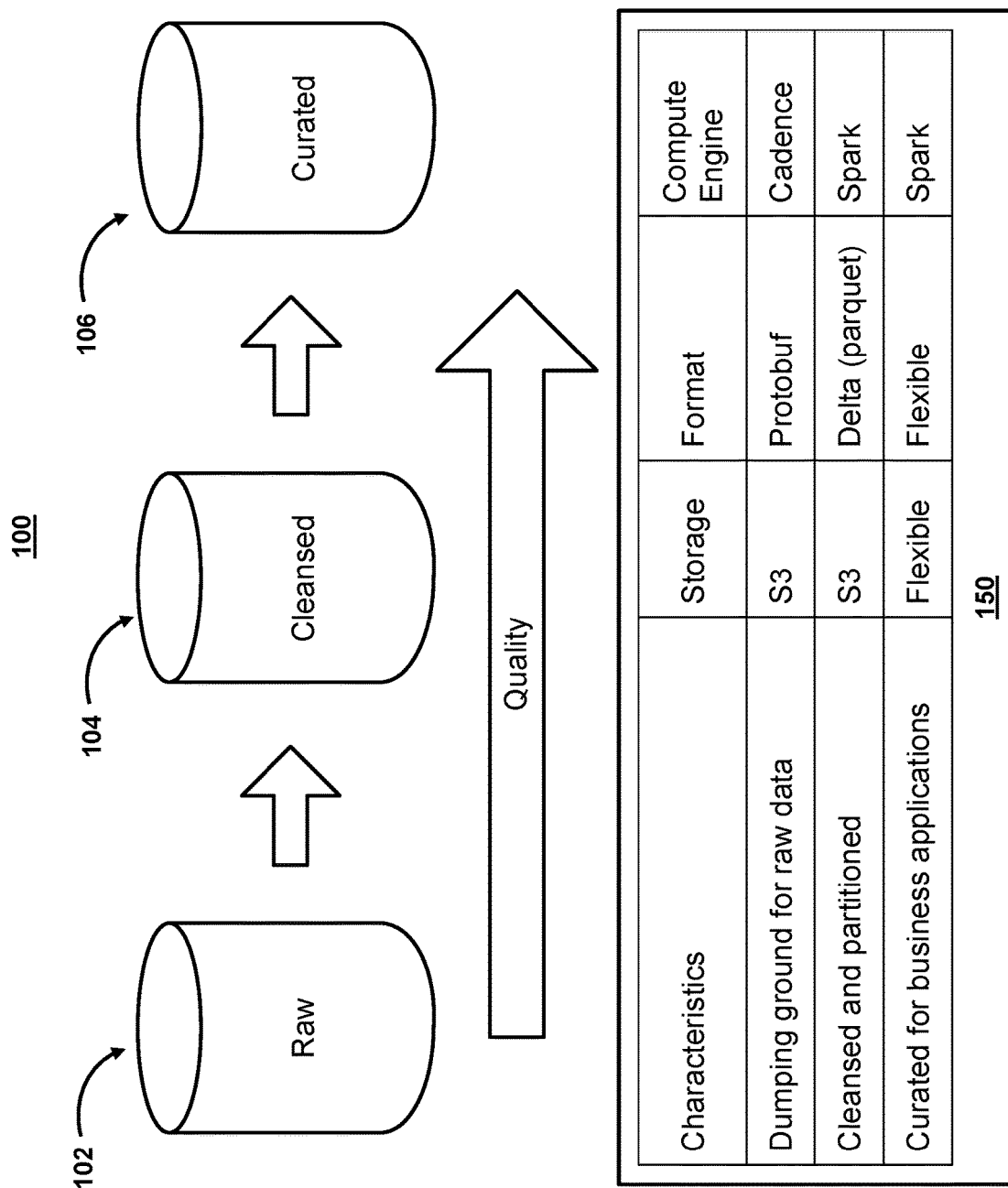
FIG. 1 shows an illustrative diagram for a layered approach to blockchain storage and processing, in accordance with one or more embodiments.

FIG. 1 shows an illustrative diagram for a layered approach to blockchain storage and processing, in accordance with one or more embodiments. For example, FIG. 1 includes diagram 100 and chart 150. Diagram 100 illustrates the layers approach to blockchain storage and processing through the use of various datasets and/or layers. For example, diagram 100 includes dataset 102, dataset 104, and dataset 106. For example, diagram 100 illustrates a novel architecture, which enables different applications to access and use blockchain data in an efficient and flexible manner. For example, diagram 100 may illustrate an architecture of a data modeling or structuring tool of continuously running streaming applications, interconnected by datasets at different quality levels. For example, rather than going directly from raw data (e.g., blockchain data) to finished product (e.g., curated data), the data quality is improved incrementally until it is ready for consumption. Furthermore, using this architecture, new data may be processed incrementally as it arrives, and the same programming model may be reused to efficiently process historical data, which improves the maintainability of the system.

Notably, the architecture, unlike that of traditional approaches, decouples the storage system from the compute system, which allows the storage system to scale out (or up) as dictated by the workload. Furthermore, the data is saved as files with open formats at different granularity levels, enabling different layers to choose the most appropriate compute engine. This flexibility—the ability to choose the storage system, data format, as well as compute engine that are best suited for the workloads at hand, is a key advantage of the architecture.

Diagram 100 may represent a multi-layer data platform for indexing on-chain data. As shown in FIG. 1, the multi-layer data platform may comprise a plurality of datasets, each with their own respective characteristics (e.g., as shown by chart 150). The datasets may transition from a lower quality to a higher quality dataset (e.g., transition from raw data to highly curated data).

For example, the multi-layer data platform may comprise a dataset 102. Dataset 102 may receive raw on-chain data (e.g., hexadecimal encoded data) from one or more blocks of a blockchain network via a blockchain node. Dataset 102 may be populated by the system transforming the raw on-chain data to a first format. For example, as indicated by chart 150, the first dataset may comprise a structured data structure defined in protocol buffers (Protobuf) format. For example, Protobuf is a data format used to serialize structured data. Protobuf comprises an interface description language that describes the structure of some data and a program that generates source code from that description for generating or parsing a stream of bytes that represents the structured data. For example, the first dataset may use a schema that associates data types with field names, using integers to identify each field. That is, the data may contain only the numbers, not the field names, which generates bandwidth/storage savings as compared with schemas that include the field names in the data.

Dataset 102 may comprise a blockchain-interface layer and may use a compute engine, wherein the compute engine comprises a first workflow architecture, wherein the first workflow architecture comprises a first threshold for workflow throughout and a first threshold for a number of workflows. For example, the system may select a compute engine for processing data in the first data dataset based on the workflow architecture of the compute engine. For example, the main limitation of a workflow architecture with a low threshold for workflow throughout (e.g., a threshold rate at which events may be processed) and a high threshold number of workflows (e.g., a threshold number of workflows that may simultaneously process events) is in data processing situations with a high amount of aggregation. For example, a workflow architecture with a low threshold for workflow throughout and a high threshold number of workflows has a limited throughput for each workflow, but this workflow architecture allows for the total number of workflows to be high. Such a workflow architecture is well suited for a dataset based on events corresponding to individual workflows (e.g., updates for given smart contracts, tokens, etc.). For example, a workflow architecture of this type may aggregate events per smart contract, token, etc., for millions of different smart contracts, tokens, etc., as the rate of events for each of these is low (e.g., less than 30 events per second). In contrast, such a workflow architecture may be ill suited for processing a dataset and/or use cases involving a high number of events in a low number of workflows. Additionally, the system may select a second compute engine (e.g., for the same or another layer and/or dataset) for processing data in a dataset based on the workflow architecture of the second compute engine. Furthermore, as the second dataset comprises on-chain data for a plurality of blocks, the workflow architecture for the second compute may require the ability to process a high rate of events. For example, as the second dataset processes and stores data at a different level of granularity, the second compute engine may require less individual workflows (e.g., a lower threshold of a number of workflows) and instead a higher rate of event processing (e.g., a high threshold for workflow throughput).

Dataset 104 may comprise, at a data lakehouse layer, a dataset that receives first on-chain data in the first format. The data lakehouse layer may transform the first on-chain data to a second format, using a second compute engine, for storage in a second dataset, wherein the second format comprises a columnar oriented format, wherein the second dataset comprises the first on-chain data and second on-chain data, and wherein the second on-chain data is from a second block on the blockchain network. For example, while the first dataset may comprise structured on semi-structured raw blockchain data, and thus delay error-prone parsing and data augmentation until later, raw blockchain data (even in a structured or semi-structured format) is difficult to use to run applications. For example, to speed up the reprocessing of the raw blockchain data, the system may build different batch processing pipelines; however, the underlying code cannot be reused for streaming processing. As such, a data lakehouse layer may comprise a different data structure type. A data lakehouse is a data solution concept that combines elements of the data warehouse with those of the data lake. Data lakehouses implement data warehouses' data structures and management features for data lakes, which are typically more cost-effective for data storage.

For example, the second dataset may comprise a columnar oriented format, which is best fitted for analytic workloads. For example, the second dataset may represent a cleansed and partitioned dataset (e.g., in contrast to the first dataset, which may comprise raw blockchain data, and the third dataset, which may be curated based on application use cases). For example, the columnar oriented format may preserve local copies (files) of remote data on worker nodes, which may avoid remote reads during instances of a high-volume of event processing.

Dataset 106 may comprise an application service layer that receives the first on-chain data and the second on-chain data in the second format (or other format of another layer). The application service layer may transform, using a third compute engine, the first on-chain data and the second on-chain data to a third format for storage in a third dataset, and wherein the third format is dynamically selected based on the application characteristic. Furthermore, the third dataset may be structure based on application needs. Additionally, the dataset may be continuously and incrementally updated based on information received from lower layers and/or the blockchain node, as well as information received by an API layer of an application. The third dataset may therefore be customized to meet the needs and formatting requirements of the API for the application. For example, the system may serve an API layer of the application. In such cases, the format used by the application service layer may be based on the API layer.

For example, the API layer of the applications can subscribe to a Kafka topic to perform further processing. For example, asset discovery of ERC-20, ERC-721, ERC-1155, etc., can be implemented this way. As one example, an application service layer may be responsible for producing the transfer events based on the token standards, and then an Asset Discovery Service (or other layer) may pull in additional on-chain (e.g., symbol/decimals) and off-chain (e.g., token icon) metadata asynchronously. An optimization may also be done in an application service layer to deduplicate the transfer events of the same address using time-based window aggregation. That is, the application service layer may use specific formats and perform specific operations based on the needs of an application and/or the best mechanism for optimizing the application (and/or its interactions with other layers/applications/data sources).

Figure 2:
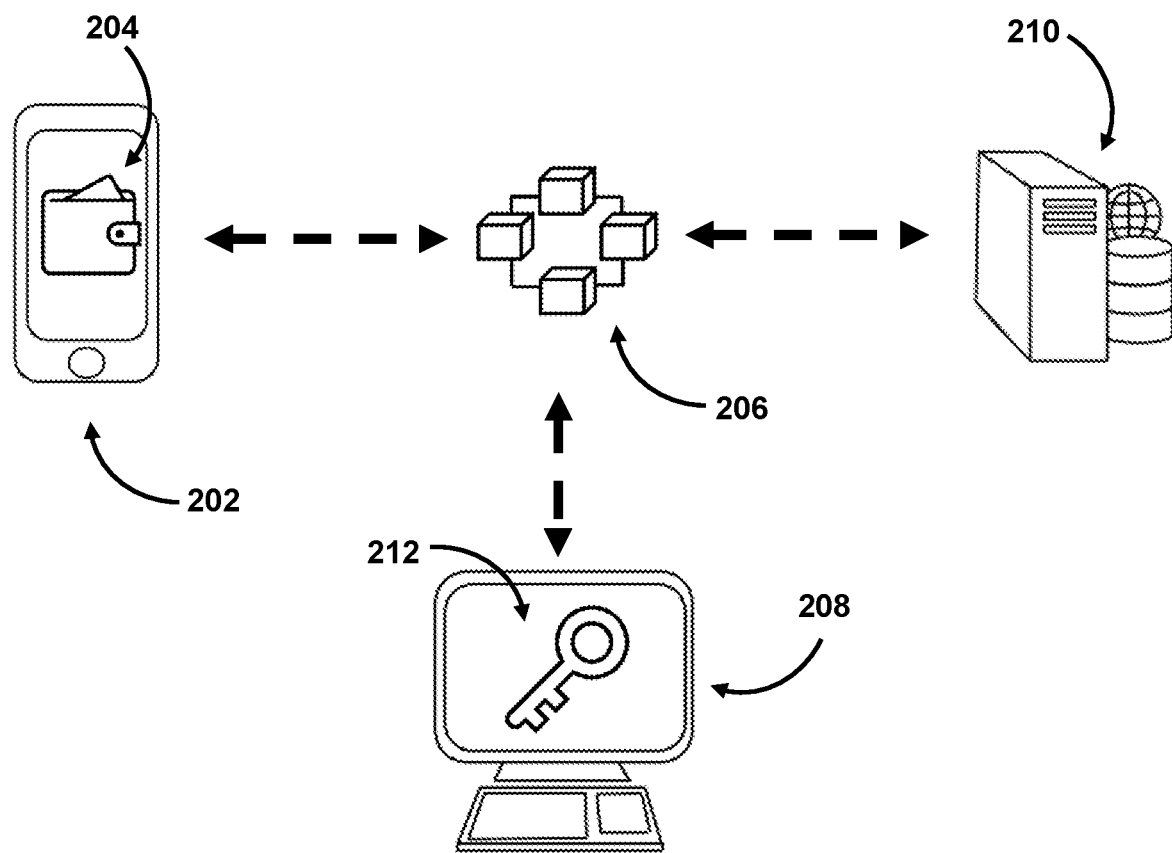
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to conduct blockchain operations in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to perform blockchain indexing, and the user interface may display content related to blockchain data. As referred to herein, "content" should be understood to mean an electronically consumable user asset, representations of goods or services, including nonfungible tokens (NFTs), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to indexing blockchain operations. As referred to herein, "blockchain operations" may comprise any operations, including and/or related to blockchains and blockchain technology. For example, blockchain operations may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including an NFT. An NFT may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet, while cold wallets are not. Most digital wallet holders hold both a hot wallet and a cold wallet. Hot wallets are most often used to perform blockchain operations, while a cold wallet is generally used for managing a user account and may have no connection to the Internet.

As shown in FIG. 2, one or more user devices may include a cryptography-based, storage application (e.g., digital wallet 204) used to perform blockchain operations. The cryptography-based, storage application may used to perform a plurality of blockchain operations across a computer network. The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Digital wallet holders may hold both a hot wallet and a cold wallet. Hot wallets are most often used to perform blockchain operations, while a cold wallet is generally used for managing a user account and may have no connection to the internet.

In some embodiments, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain operations.

As shown in FIG. 2, one or more user devices may include a private key (e.g., key 212) and/or digital signature. For example, system 200 may use cryptographic systems for conducting blockchain operations that generate one or more on-chain events. As referred to herein, an event may comprise a state, status, or change thereof related to a block, blockchain operation, and/or a blockchain network. For example, the blockchain is a chain of information that includes the transaction information with a timestamp (e.g., events) that cannot be altered once it is recorded. For example, system 200 may use public key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner, as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively, or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
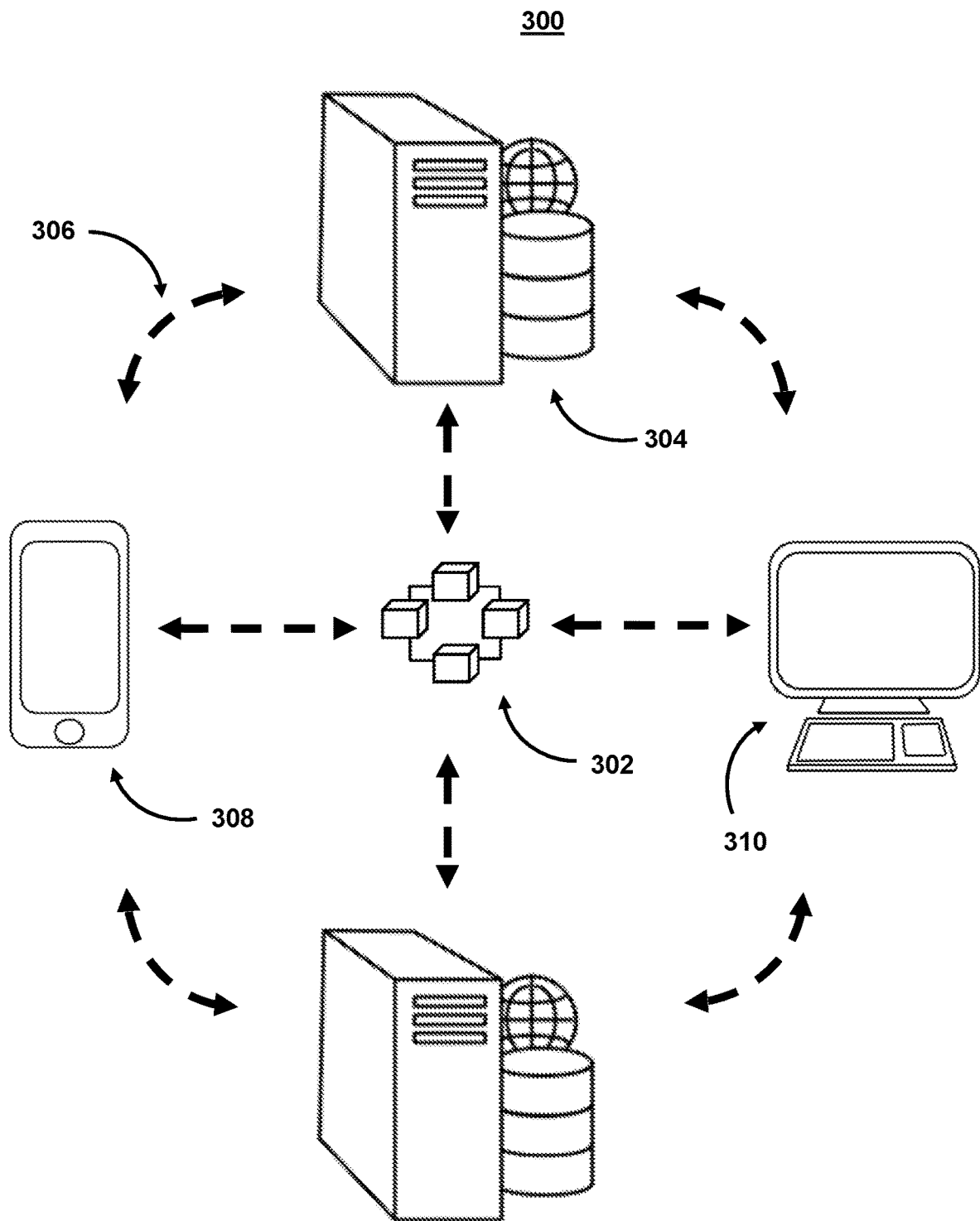
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may index blockchain operations and/or events for a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network, such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (I/O) paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to blockchain operations within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
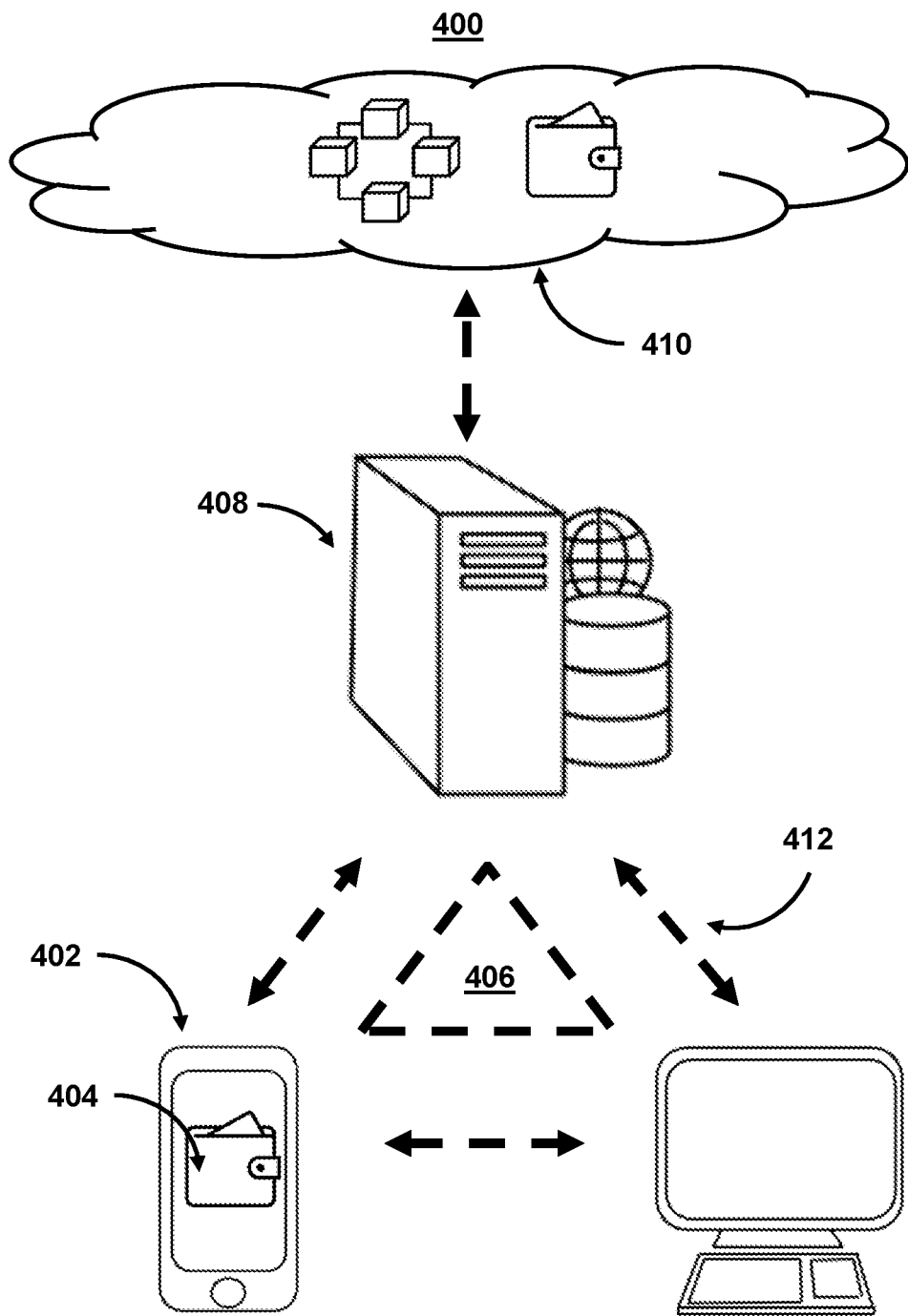
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or APIs in order to facilitate blockchain operations and/or indexing. For example, application 404 may comprise a decentralized application digital wallet and/or wallet service that is able to sign and send transactions to transfer tokens and/or perform other blockchain operations, as well as interact with one or more decentralized applications.

System 400 also includes API layer 406. In some embodiments, API layer 406 may be implemented on user device 402. Alternatively, or additionally, API layer 406 may reside on one or more cloud components (e.g., server 408). For example, API layer 406 may reside on a server 408 and comprise a platform service for a custodial wallet service, decentralized application, etc. API layer 406 (which may be a representational state transfer (REST) or web services API layer) may provide a decoupled interface to data and/or functionality of one or more applications.

API layer 406 may provide various low-level and/or blockchain-specific operations in order to facilitate blockchain operations and/or indexing. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol (SOAP) web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers, such as API layer 406, services, and applications, are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/ or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more application binary interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, making translations between human-intended method calls and smart contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
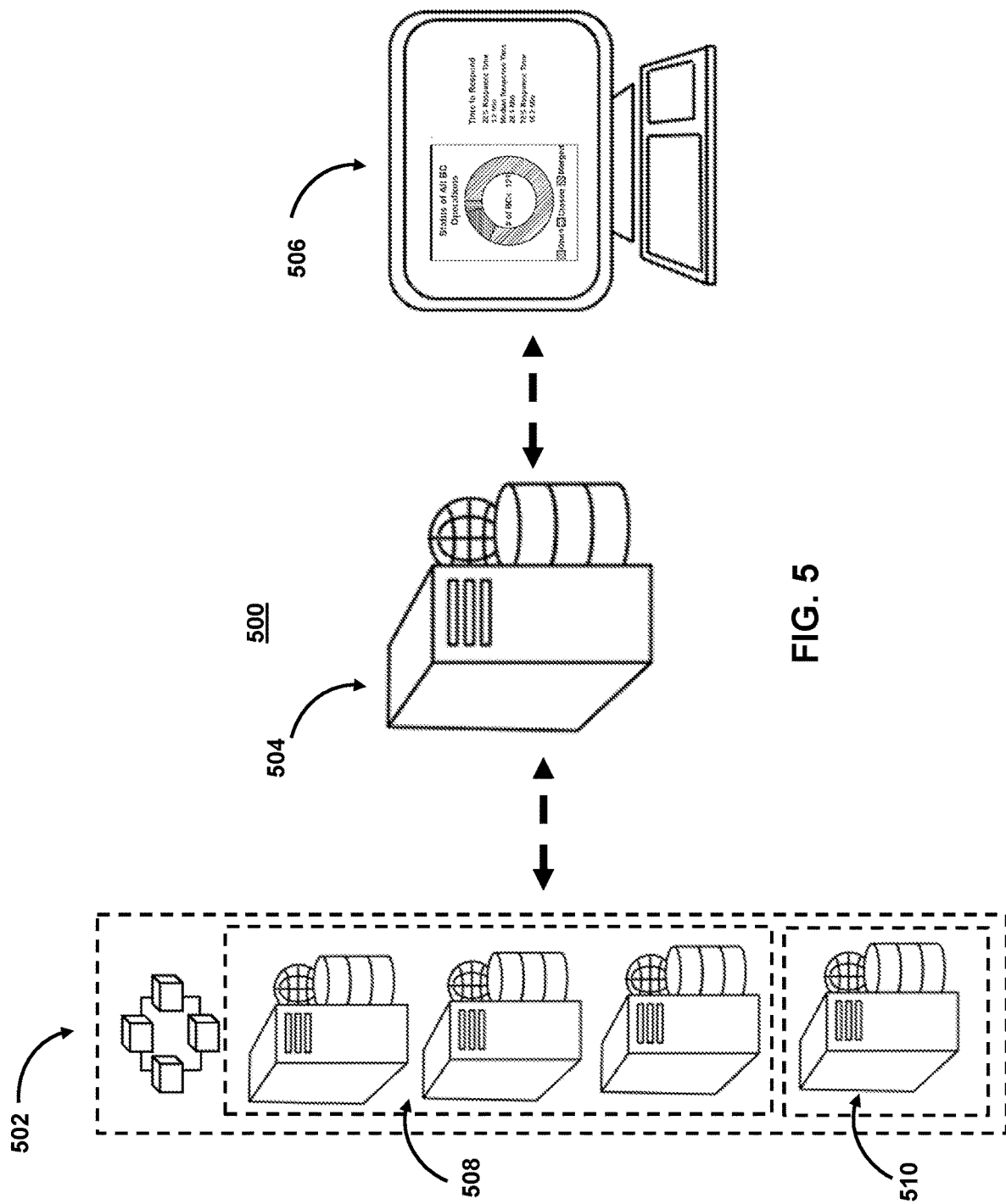
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to facilitate blockchain operations and/or indexing. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.), as well as blockchain operations related to a given protocol, protocol subgroup, and/or other characteristic (e.g., "ETH," "ERC20," and/or "ERC721"). Additionally, and/or alternatively, the various blockchain operations and metadata related to those blockchain operations (e.g., block designations, user accounts, time stamps, etc.), as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Indexer 504 may implement one or more storage and compute layers and may access data stored in one or more datasets. For example, indexer 504 may access one or more blockchain nodes (e.g., node 508 or node 510) to determine a state of one or more blockchain operations and/or smart contracts. For example, the blockchain is as a distributed world computer, where a number of distributed nodes (e.g., node 508 or node 510) keep track of the same global state and agree upon what state transitions should occur at each block. Each new block in the blockchain is based on consensus and contains the individual transactions that describe the state transition from the previous block to the current one. By replicating the state transitions, such as transactions, the state at any given point in time can be reconstructed by replaying the state transitions according to the rules defined by the blockchain and its associated smart contracts.

To do so, indexer 504 may identify the transactions, receipts, event logs, call traces, as well as the block header and uncle blocks, which would be sufficient to describe the state transitions for the majority of use cases (while minimizing resources needed for storage and processing). For example, to calculate the address balance of the global ledger, indexer 504 selects all the transactions and internal transactions with a non-zero value, projects them as credit/debit operations on from/to addresses, groups the credit/debit operations by address, and then sums up the values. Similarly, though the states of the smart contracts are not extracted, their state transitions can be observed by decoding the event logs and call traces. For example, ERC20-compliant transactions emit a transfer event log for each token transfer, which can be used to derive the token balance of each address. For deeper insights in smart contracts, indexer 504 can decode the call traces, also known as internal transactions, using the ABI of the smart contract. The internal transactions capture information about interactions from one smart contract to another. This type of transaction is widely used in the Ethereum ecosystem, where smart contracts are used as building blocks for more complex interactions.

Indexer 504 may replicate on-chain data (e.g., the transactions, receipts, event logs, call traces, block headers, uncle blocks, and/or any other information storage on blockchain 502 and/or needed to describe the state transitions) into a scalable storage and democratizes access to blockchain data. For example, this first dataset (e.g., dataset 102 (FIG. 1)) is sufficient as the single source of truth for any further processing needs, in contrast to the traditional ETL ("extract, transform and load") tools for ingesting blockchain data. Indexer 504 may perform each ETL step differently than a conventional approach. For example, indexer 504 may extract raw data from a pool of load-balanced nodes in parallel. A consensus algorithm is built in to handle chain reorg (e.g., diagram 600 (FIG. 6)). Indexer 504 may extract the data needed from the nodes such that indexer 504 may never need to go back and query them again.

During the load stage, the raw block data is persisted in S3 while the meta data is stored in DynamoDB. A carefully designed key-value schema (e.g., schema 700 (FIG. 7)) is chosen to enable out of order parallel ingestion, while ensuring the observable state is strictly ordered. Indexer 504 may use chain-native and chain-agnostic parsers shipped as part of the elopement kit ("SDK"), but not executed during data ingestion.

Indexer 504 may use batch APIs that are available to read blocks in a horizontally scalable manner. Explicit tradeoff is made in the query patterns to support only block-level APIs. As a result, data schema and locality can be optimized so that the read latency is on par with the existing indexers built on top of relational databases.

In some embodiments, indexer 504 may use streaming APIs. Streaming APIs enable downstream systems to keep pace with the blockchain state while being aware of the chain reorg events. Events returned by the streaming APIs are strictly ordered and deterministic. A mono-increasing sequence number is attached to each event to simplify reorg handling. (e.g., diagram 600 (FIG. 6)).

One of the main challenges here is how to extract data from the node efficiently. One naïve approach would be querying from a single node, thereby eliminating the need to deal with chain reorganization or inconsistent state between the nodes. Apparently, this approach is bottlenecked by the limited throughput of a single node. On the other hand, if blocks are queried from a pool of load-balanced nodes, it would be tricky to implement a consensus algorithm to resolve potentially inconsistent states between the nodes.

In view of this, indexer 504 uses master nodes to query the information as to what blocks are on the canonical chains. Sticky sessions are enabled while reading from the master nodes (e.g., node 508) so that the queries are served by the same node (and fall back to a different node when the previous one goes unhealthy). To make this query faster, indexer 504 may generally use the batch API to query a range of blocks, without requesting the full transaction objects. Once the block identifiers on the canonical chain are resolved from the master nodes, the full blocks are extracted in parallel and out of order from the slave nodes, which are backed by a pool of load-balanced nodes (e.g., node 510).

Figure 6:
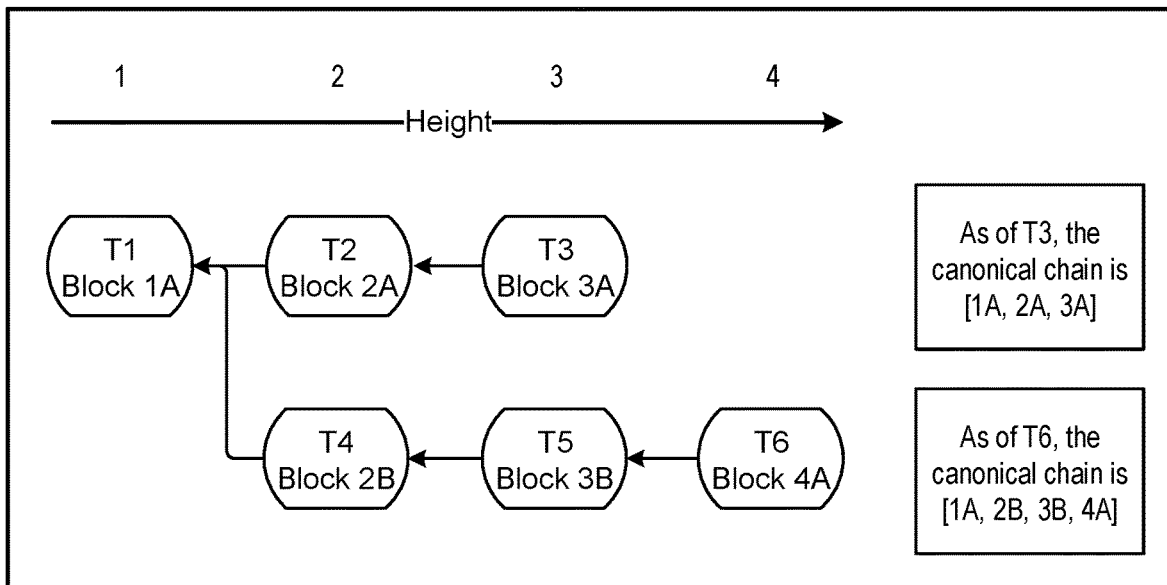
FIG. 6 shows an illustrative diagram illustrating mono-increasing sequence records, in accordance with one or more embodiments.
Figure 6:
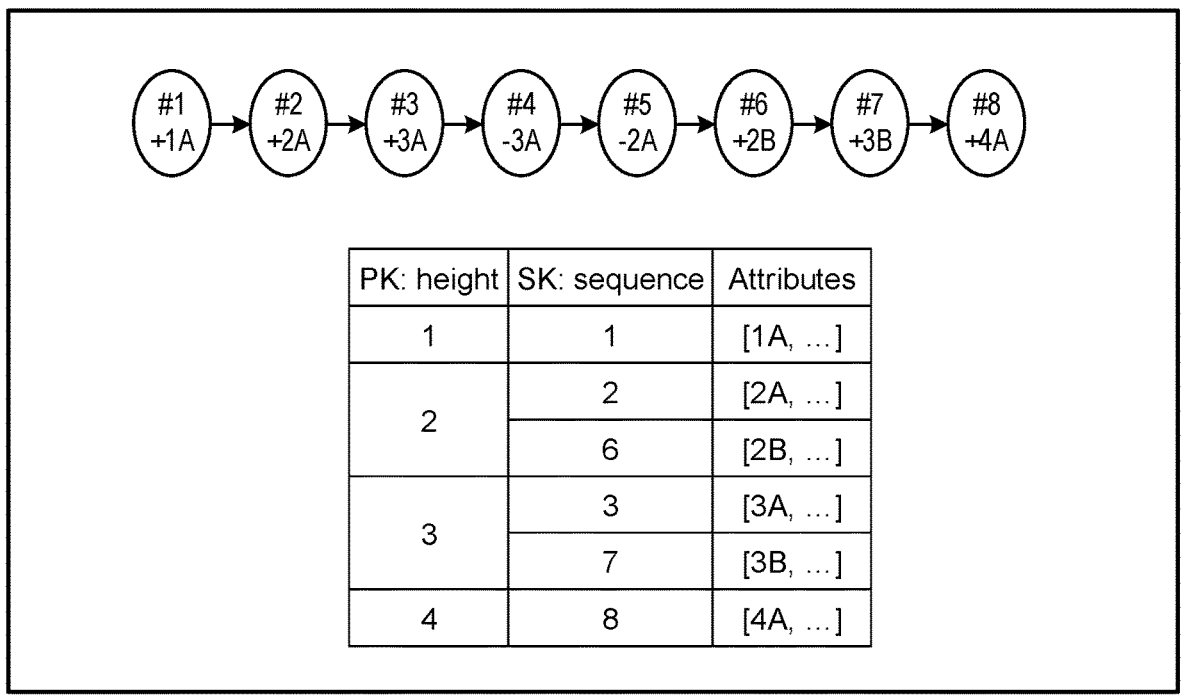

FIG. 6 shows an illustrative diagram illustrating mono-increasing sequence records, in accordance with one or more embodiments. For example, diagram 600 may illustrate an approach to deal with one of the main challenges in designing a dataset, specifically, how to handle chain reorganization. For example, though the blocks themselves are immutable in the blockchain, what the canonical chain is constituted of could change due to chain reorgs, as illustrated in diagram 600.

For example, as shown in diagram 600, the changes to the state of the blockchain are modeled as a strictly ordered sequence of added (+) or removed (−) events. Each event is associated with a mono-increasing sequence number, making it easier to implement the change-data-capture pattern in later steps. For example, the canonical chain can be reconstructed by grouping the events by height and taking the item with the largest sequence number from each group. For example, the block stream above can be replicated into a key-value store such as DynamoDB using the time-based versioning pattern.

The system (e.g., implemented on indexer 504 (FIG. 5)) may then generate records (e.g., as shown in table 650) that provide a reorganization-immune blockchain index using the mono-increasing sequence records. For example, as shown in diagram 600, the system may receive on-chain data for a plurality of blocks, wherein the plurality of blocks comprises a first block comprising a first event of a plurality of blockchain events within the on-chain data. The system may determine a sequence number and a chain height for each block as recorded in table 650. The system may use table 650 to update the blockchain index (e.g., as stored on indexer 504). For example, the system may determine the block with the highest sequence number for each block height. The system may then determine the canonical chain for the blockchain based on the blocks that have the highest sequence number for each group of blocks (e.g., blocks having the same chain height). The system may then update a blockchain index to indicate the blocks that correspond to the canonical chain.

Figure 7:
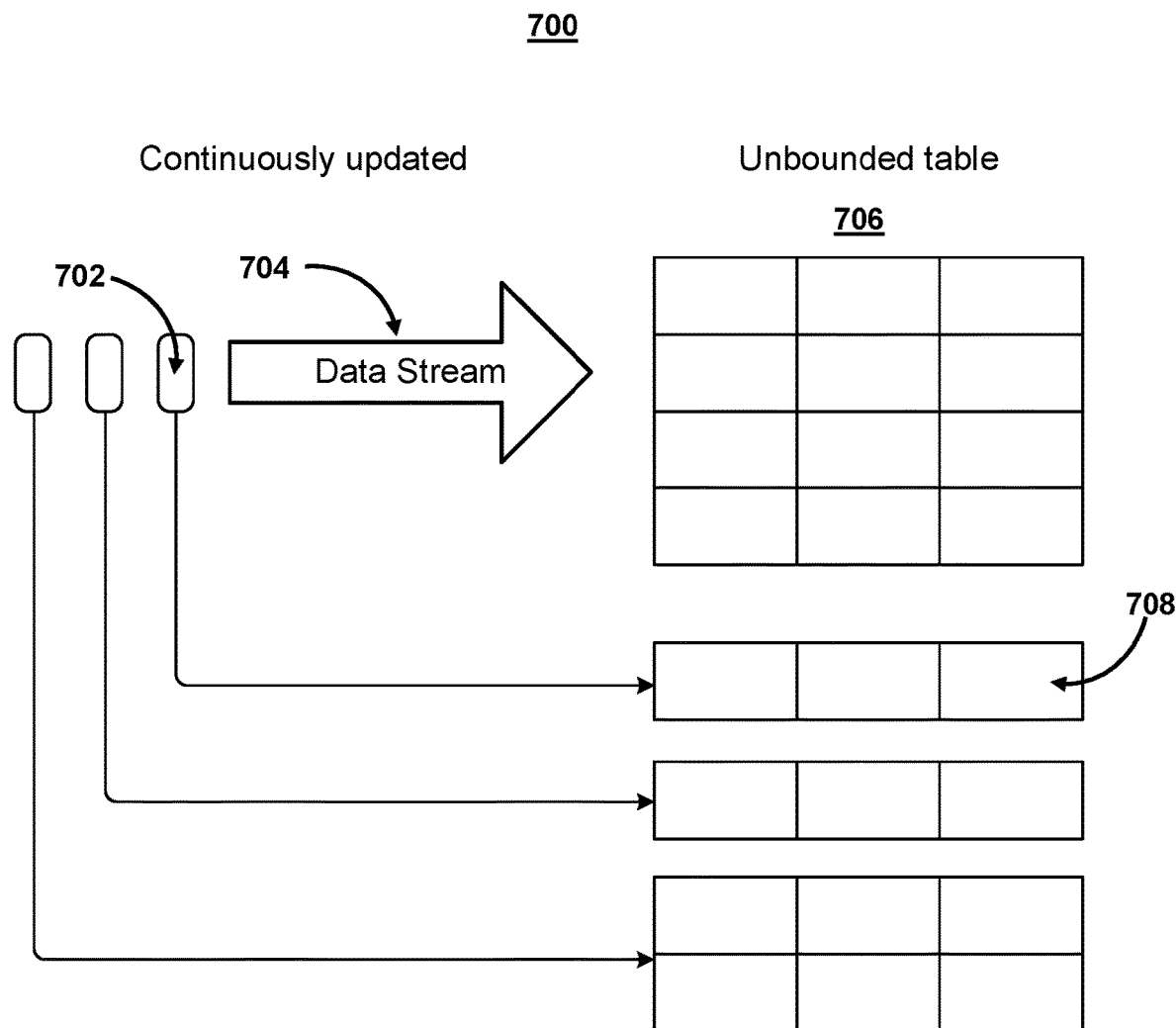
FIG. 7 shows an illustrative diagram for a blockchain indexer, in accordance with one or more embodiments.

FIG. 7 shows an illustrative diagram for a blockchain indexer, in accordance with one or more embodiments. For example, while the layered storage approach mitigates the data availability problem by recording raw blockchain data to an indexer, building business applications directly on top of a dataset featuring raw blockchain data is still a tedious process. Time to reprocess the entire blockchain history is reduced from weeks to days, but it is still not good enough for rapid product iterations. To speed up the reprocessing, the system may have to build a vastly different batch processing pipeline to improve the throughput, yet the code cannot be reused for streaming processing.

These limitations led to the development of a second dataset, which may be built on top of data lakehouse technologies. The data lakehouse is a new paradigm that combines the best elements of data lake and data warehouses. In the additional dataset, the dataset is partitioned at a larger granularity (e.g., many blocks per partition) and optimized for parallel workloads in Apache Spark. For example, hundreds of blocks of data may be stored as a single parquet file, amortizing the overhead of task scheduling and network round trips.

The underlying storage may be in columnar format, so only the data needed by the query is loaded into memory. This is important from a performance point of view, because a typical application only needs to read a small portion of this dataset. Additionally, a dataset can be written incrementally while downstream consumers are reading from it simultaneously; therefore, the complex business data flow can be modeled as a continuously running streaming application, as shown in schema 700. For example, schema 700 include a continuously running data stream (e.g., comprising data 702 and data 704).

For example, table 706 may comprise an append-only delta table of the continuously running data stream. Table 706 may be a continuous replication of a first dataset (e.g., dataset 102 (FIG. 1)) with an end-to-end exactly-once-delivery guarantee. Table 706 may present a canonical view of the blockchain state and/or a transaction-canonical-view, where new transactions are inserted and orphaned transactions are soft deleted. In addition to these tables, the system can further decode and enrich the dataset. For example, the system may use the ABI of smart contracts to turn the encoded data (such as event logs and traces) into decoded data (such as ERC-20 token transfers). By materializing these intermediate tables, downstream users can work with semantic-rich data models rather than low-level details.

Table 706 may model the data stream as an unbounded, continuously updated table. As new data (e.g., data 702 or data 704) is made available in the input data stream, one or more rows (e.g., row 708) are appended to the unbounded table as a micro batch. From the perspective of downstream users, the query on this conceptual input table can be defined as if it were a static table. For example, the system may automatically convert this batch-like query to a streaming execution plan through incrementalization, which determines what state needs to be maintained to update the result each time a new micro batch arrives.

Figure 8:
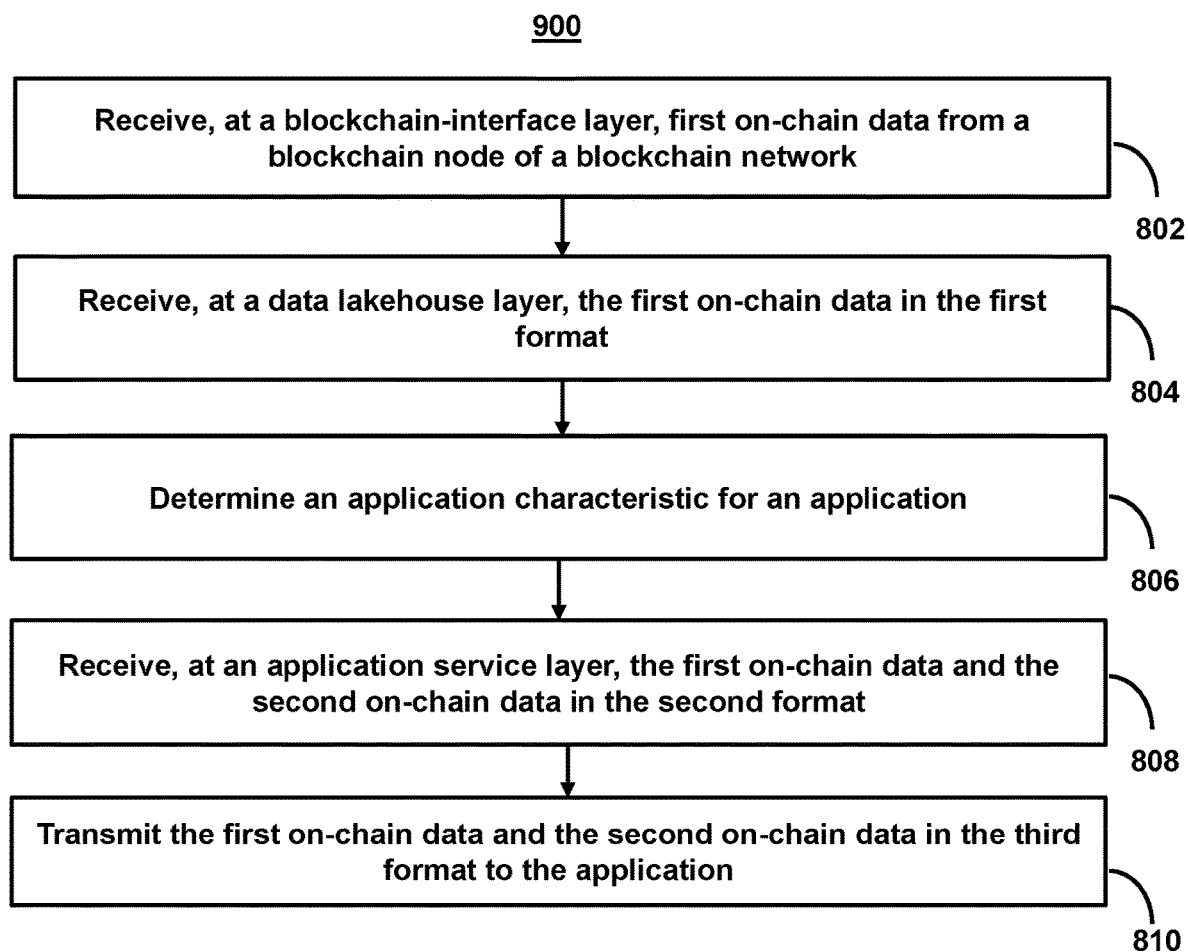
FIG. 8 shows a flowchart of the steps involved in improving blockchain data indexing by decoupling compute and storage layers, in accordance with one or more embodiments.

FIG. 8 shows a flowchart of the steps involved in improving blockchain data indexing by decoupling compute and storage layers, in accordance with one or more embodiments.

At step 802, process 800 (e.g., using one or more components described above) receives, at a blockchain-interface layer, first on-chain data from a blockchain node of a blockchain network. For example, the system may receive, at a blockchain-interface layer, first on-chain data from a blockchain node of a blockchain network. For example, the system may use multiple layers (or layered programs to introduce technical efficiencies into the indexing process). Each layer may comprise separate functional components that interact with other layers in a sequential and/or hierarchical manner. In some embodiments, each layer may interface only with a layer above it and the layer below it (e.g., in the programming stack).

The first on-chain data may comprise hexadecimal encoded data from a first block of the blockchain network. For example, the system may receive raw blockchain data. The raw blockchain data may comprise alphanumeric characters and/or alphanumeric text strings. In some embodiments, on-chain data may comprise data as retrieved from, or available on, a block of a blockchain network. For example, on-chain data may comprise data as retrieved from a node and prior to any local processing to cleanse, modify, and/or organize the data. For example, in many blockchain networks, raw blockchain data is written in a hexadecimal encoded format. For example, hexadecimal encoding is a transfer encoding in which each byte is converted to the 2-digit base-16 encoding of that byte (preserving leading zeros), which is then usually encoded in ASCII.

The blockchain-interface layer may transform the first on-chain data to a first format, using a first compute engine, for storage in a first dataset. For example, raw blockchain data may comprise unstructured data. Unstructured data may be information that either does not have a predefined data model or is not organized in a predefined manner. Unstructured data may comprise alphanumeric character strings and/or hexadecimal strings. For example, unstructured data, which may be categorized as qualitative data, cannot be processed and analyzed via conventional data tools and methods. Since unstructured data does not have a predefined data model, the system may best manage it in a non-relational (NoSQL) database or to use one or more data lakes to preserve it in raw form.

In some embodiments, a compute engine may comprise a customizable compute service that the system may use to create and run virtual machines and perform tasks on a given dataset. Each compute engine may comprise a given schema. The schema may comprise an architecture of how data will be processed, and a database schema describes the shape of the data and how it relates to other models, tables, and databases. For example, a database entry may be an instance of the database schema, containing all the properties described in the schema.

In some embodiments, the first format may comprise data types with field names identified by a respective integer. For example, the first dataset may comprise a structured data structure defined in protocol buffers (Protobuf) format. For example, Protobuf is a data format used to serialize structured data. Protobuf comprises an interface description language that describes the structure of some data and a program that generates source code from that description for generating or parsing a stream of bytes that represents the structured data. For example, the first dataset may use a schema that associates data types with field names, using integers to identify each field. That is, the data may contain only the numbers, not the field names, which generates bandwidth/storage savings as compared with schemas that include the field names in the data.

In some embodiments, transforming the first on-chain data to the first format may comprise receiving unstructured on-chain data, determining a structuring condition based on the first format, and applying the structuring condition to the unstructured on-chain data to generate structured on-chain data. For example, each new block in the blockchain is based on consensus and contains the individual transactions that describe the state transition from the previous block to the current one. By replicating the state transitions, such as transactions, the state at any given point in time can be reconstructed by replaying the state transitions according to the rules defined by the blockchain and its associated smart contracts. For example, in a first blockchain network (e.g., Ethereum), the system may determine that the transactions, receipts, event logs, call traces, block headers, and/or uncle blocks (or a subset thereof) are sufficient to describe the state transitions for a given application's use cases. For example, to calculate the address balance of the global ledger, the system may select all the transactions and internal transactions with a non-zero value, project them as credit/debit operations on from/to addresses, group the credit/debit operations by address, and then sum up the values. The system may receive this unstructured data and transform it to a structured format in the indexing application using a structuring condition. For example, a structuring condition may be based on an order of blocks in a blockchain. That is, the system may retrieve the unstructured on-chain data (e.g., comprising one or more state transitions) and may structure this data into a series of blockchain operations. In another example, the structuring condition may be based on a given smart contract, user, wallet address, etc. The system may then structure the various state transitions in the unstructured on-chain data into a serial repository of blockchain operations involving the given smart contract, user, wallet address, etc.

In some embodiments, the system may transform the first on-chain data to the first format by receiving unstructured on-chain data, parsing the unstructured on-chain data for an unstructured on-chain data characteristic, and generating a semantic marker for the unstructured on-chain data characteristic, wherein the semantic marker is stored in the first dataset. For example, an unstructured on-chain data characteristic may comprise any quantitative or qualitative characteristic of the unstructured on-chain data that distinguishes one portion of the unstructured on-chain data from another. For example, the unstructured on-chain data characteristic may comprise an appearance (or lack thereof) of a specific text string of alphanumeric characters, an order (or lack thereof) of alphanumeric characters, etc. The system may transform this to structured data.

For example, the first dataset may comprise semi-structured data. Semi-structured data may not have a predefined data model and is more complex than structured data, but may be easier to store than unstructured data. Semi-structured data uses metadata (e.g., tags and semantic markers) to identify specific data characteristics and scale data into records and preset fields. The system may use the metadata to better catalog, search, and analyze the data in the first dataset than unstructured data.

In some embodiments, receiving the first on-chain data from the blockchain node may comprise the system selecting the first block of the blockchain network, querying the first block for available data matching a retrieval criterion, and executing a retrieval operation to retrieve any available data matching the retrieval criterion. For example, the system may select a given block from the blockchain network and extract all required information from the block.

In some embodiments, the system may select the block in response to detecting that information has not yet been retrieved from the block or that specific information (e.g., relating to a specific blockchain operation) is located in the block. For example, the system may query a given block for all available information. By doing so, the system does not need to return to the block (or blockchain network) again. When doing so, the system may extract a subset of the available data in the block in order to minimize processing loads and storage resources. In such cases, the system may retrieve only available data that matches one or more retrieval criteria. For example, the system may retrieve raw smart contract storage data, which is not easily available. Without the smart contract storage data, the system may have to re-query and re-extract data from archive nodes. For example, by extracting core smart contract storage data, the system may avoid instances where the system must re-query the block to extract a new state out of smart contracts that were previously not supported.

The system may determine what data is required and/or what data comprises smart contract storage data based on the blockchain network. Extracting smart contract storage data may comprise extracting information on the transaction, event logs, and/or traces, as well as the block header and uncle blocks. For example, uncle blocks are created when two blocks are mined and broadcasted at the same time (with the same block number). Since only one of the blocks can enter the primary Ethereum chain, the block that gets validated across more nodes becomes the canonical block, and the other one becomes what is known as an uncle block. In some embodiments, the system may store uncle information in order to support reorganization immunity for blockchain data sets.

Furthermore, for a smart contract specific state, if the state is emitted as part of the event logs or traces, then the system does not need to go back and re-extract additional data from the archive nodes. For example, the system may execute a retrieval operation that parses the unstructured raw blockchain data for any available data that matches one or more retrieval criteria. In some embodiments, the system may use parsing criteria specific to the retrieval operation.

Figure 9:
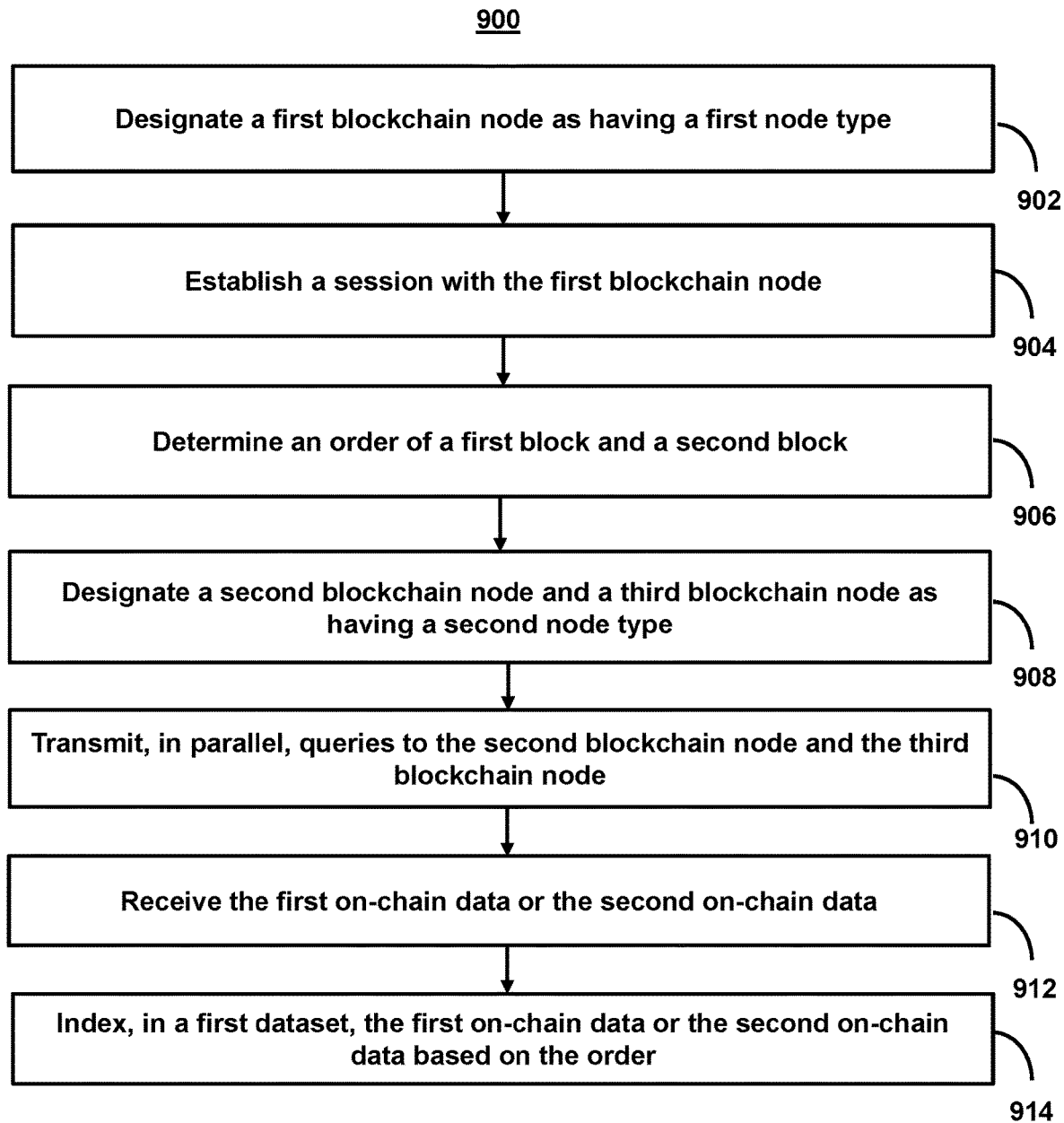
FIG. 9 shows a flowchart of the steps involved in improving blockchain data indexing by avoiding throughput bottlenecks caused by reliance on a single blockchain node, in accordance with one or more embodiments.

To increase efficiency, in some embodiments, the system may designate a first blockchain node of a plurality of blockchain nodes for a blockchain network as having a first node type, and based on designating the first blockchain node of the plurality of blockchain nodes as having the first node type, establish a session with the first blockchain node. For example, the system may implement process 900 (FIG. 9).

At step 804, process 800 (e.g., using one or more components described above) receives, at a data lakehouse layer, the first on-chain data in the first format. For example, while the first dataset may comprise structured on semi-structured raw blockchain data, and thus delay error-prone parsing and data augmentation until later, raw blockchain data (even in a structured or semi-structured format) is difficult to use to run applications. For example, to speed up the reprocessing of the raw blockchain data, the system may build different batch processing pipelines; however, the underlying code cannot be reused for streaming processing. As such, a data lakehouse layer may comprise a different data structure type.

In some embodiments, the data lakehouse layer may comprises a combination of a data lake with a data warehouse in a single data platform. A data lakehouse is a data solution concept that combines elements of the data warehouse with those of the data lake. Data lakehouses implement data warehouses' data structures and management features for data lakes, which are typically more cost-effective for data storage. For example, a data lake is a centralized repository that allows the system to store structured and unstructured data at any scale. The system can store data as-is, without having to first structure the data, and run different types of analytics—from dashboards and visualizations to big data processing, real-time analytics, and machine learning to guide better decisions. In contrast, a data warehouse is a type of data management system that is designed to enable and support business intelligence activities, especially analytics. Data warehouses are solely intended to perform queries and analysis and often contain large amounts of historical data. The data within a data warehouse is usually derived from a wide range of sources such as application log files and transaction applications. Data lakehouses are useful to data scientists as they enable machine learning and business intelligence.

For example, the system may receive, at a data lakehouse layer, the first on-chain data in the first format, wherein the data lakehouse layer transforms the first on-chain data to a second format, using a second compute engine, for storage in a second dataset. For example, the second dataset may be partitioned at a larger granularity (e.g., many blocks per partition) than the first dataset. Additionally or alternatively, the workflow architecture of the compute engine for the second dataset may be optimized for parallel workloads with high processing rates.

In some embodiments, the second format comprises a columnar oriented format, wherein the second dataset comprises the first on-chain data and second on-chain data, and wherein the second on-chain data is from a second block on the blockchain network. For example, the second dataset may be partitioned at a larger granularity (e.g., many blocks per partition) than the first dataset. Additionally or alternatively, the workflow architecture of the compute engine for the second dataset may be optimized for parallel workloads with high processing rates.

In some embodiments, the first dataset may maintain the first on-chain data as the hexadecimal encoded data while in the first format, wherein the second dataset does not maintain the first on-chain data as the hexadecimal encoded data while in the second format. In some embodiments, the system may format raw blockchain data to be structured or semi-structured, but may maintain the native programming/coding language. For example, for both ERC20 and NFT data, the system may store the raw (e.g., hexadecimal encoded data) event logs and traces in the first dataset. The system may perform this as the raw blockchain data for these protocols does not create additional processing burdens for the compute engine. For example, the system may determine that a modification of a workflow architecture is not required to process this data while serving application requests.

At step 806, process 800 (e.g., using one or more components described above) determines an application characteristic for an application. For example, the system may determine an application characteristic for an application that performs blockchain operations using the first on-chain data or the second on-chain data. For example, the system may determine application characteristics for business-level applications. While the compute engine may remain in some embodiments, the system may select the storage system and/or format that best suits the application's needs.

At step 808, process 800 (e.g., using one or more components described above) receives, at an application service layer, the first on-chain data and the second on-chain data in the second format. For example, the system may receive, at an application service layer, the first on-chain data and the second on-chain data in the second format, wherein the application service layer transforms, using a third compute engine, the first on-chain data and the second on-chain data to a third format for storage in a third dataset. Furthermore, the third dataset may be structure based on application needs. Furthermore, the dataset may be continuously and incrementally updated based on information received from lower layers and/or the blockchain node, as well as information received by an API layer of an application. The third dataset may therefore be customized to meet the needs and formatting requirements of the API for the application.

For example, the third format may be dynamically selected based on the application characteristic. For example, the API layer of the applications can subscribe to a Kafka topic to perform further processing. For example, asset discovery of ERC-20, ERC-721, ERC-1155, etc., can be implemented this way. As one example, an application service layer may be responsible for producing the transfer events based on the token standards, and then an Asset Discovery Service (or other layer) may pull in additional on-chain (e.g., symbol/decimals) and off-chain metadata (e.g., token icon) asynchronously. An optimization may also be done in an application service layer to deduplicate the transfer events of the same address using time-based window aggregation. That is, the application service layer may use specific formats and perform specific operations based on the needs of an application and/or the best mechanism for optimizing the application (and/or its interactions with other layers/applications/data sources).

In some embodiments, the system may select a format based on data freshness. For example, a technical challenge in dealing with blockchain data is how quickly a system may reprocess the entire blockchain in order to transmit the data to an application. Depending on the data freshness requirements for a given application the system may select a format that is optimized for throughput as opposed to latency. For example, the system may determine the application characteristic by determining a data freshness requirement for the application and selecting the third format from a plurality of formats based on the third format corresponding to the data freshness requirement.

Additionally, or alternatively, the system may select a dataset from which an application should pull data. For example, end-to-end data freshness is mainly constrained by the type of compute engine selection (e.g., the threshold for workflow throughput, whether the compute engine is batch-oriented, stream-oriented, or real-time oriented, and/or other compute engine performance metrics). Accordingly, the system may select the compute engine based on the needs of a requesting application. Furthermore, for time-critical use cases where historical data is unnecessary, the system can communicate with the blockchain nodes directly. Alternatively, or additionally, the system may use a streaming API, which may provide better data freshness (e.g., at about 30 seconds from block production time). For example, the system may receive a request, from the application, for the first on-chain data and the second on-chain data. The system may then select between the blockchain node, the first dataset, the second dataset, and the third dataset for responding to the request based on the application characteristic.

At step 810, process 800 (e.g., using one or more components described above) transmits the first on-chain data and the second on-chain data in the third format to the application. For example, the system may transmit the first on-chain data and the second on-chain data in the third format to the application. For example, the system may serve an API layer of the application. In such cases, the format used by the application service layer may be based on the API layer.

In some embodiments, the system may use different compute engines at each layer. For example, the first compute engine may comprise a first workflow architecture, wherein the first workflow architecture comprises a first threshold for workflow throughout and a first threshold for a number of workflows. For example, the system may select a compute engine for processing data in the first data dataset based on the workflow architecture of the compute engine. For example, the main limitation of a workflow architecture with a low threshold for workflow throughout (e.g., a threshold rate at which events may be processed) and a high threshold number of workflows (e.g., a threshold number of workflows that may simultaneously process events) is in data processing situations with a high amount of aggregation. For example, a workflow architecture with a low threshold for workflow throughout and a high threshold number of workflows has a limited throughput for each workflow, but this workflow architecture allows for the total number of workflows to be high. Such a workflow architecture is well suited for a dataset based on events corresponding to individual workflows (e.g., updates for given smart contracts, tokens, etc.). For example, a workflow architecture of this type may aggregate events per smart contract, token, etc., for millions of different smart contracts, tokens, etc., as the rate of events for each of these is low (e.g., less than 30 events per second). In contrast, such a workflow architecture may be ill suited for processing a dataset and/or use cases involving a high number on events in a low number of workflows.

Additionally, or alternatively, the second compute engine and/or third compute engine may comprise a second workflow architecture, wherein the second workflow architecture comprises a second threshold for workflow throughout and a second threshold for the number of workflows, wherein the second threshold for workflow throughput is higher than the first threshold for workflow throughput, and wherein the second threshold for the number of workflows is lower than the first threshold for the number of workflows. For example, the system may select a second compute engine for processing data in the second data dataset based on the workflow architecture of the second compute engine. Furthermore, as the second dataset comprises on-chain data for a plurality of blocks, the workflow architecture for the second compute may require the ability to process a high rate of events. For example, as the second dataset processes and stores data at a different level of granularity, the second compute engine may require less individual workflows (e.g., a lower threshold of a number of workflows) and instead a higher rate of event processing (e.g., a high threshold for workflow throughput).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

FIG. 9 shows a flowchart of the steps involved in improving blockchain data indexing by avoiding throughput bottlenecks caused by reliance on a single blockchain node, in accordance with one or more embodiments.

At step 902, process 900 (e.g., using one or more components described above) designates a first blockchain node as having a first node type. For example, the system may designate a first blockchain node of a plurality of blockchain nodes for a blockchain network as having a first node type. For example, the system may designate a first node as a master node. For example, master/slave is a model of asymmetric communication or control where one device or process (the "master") controls one or more other devices or processes (the "slaves") and serves as their communication hub. In some systems, a master is selected from a group of eligible devices, with the other devices acting in the role of slaves.

In some embodiments, the system may identify a plurality of blockchain nodes for the blockchain network. The system may then determine a plurality of blockchain node identifiers, wherein the plurality of blockchain node identifiers comprises a respective blockchain node identifier for each of the plurality of blockchain nodes. For example, each node in a blockchain network may have a unique identifier that allows for that node to be specifically identified on the network. The identifier may comprise an alphanumeric character string. In some embodiments, the system may designate identifiers for blockchain node. For example, some blockchain standards (e.g., Bitcoin) do not have a unique identifier by design. For example, any property that allows someone on the network to verify whether two connections (even separated in time) are to the same node may lead to a fingerprinting attack, where this information could be used to link transactions coming from the same node together.

Furthermore, in some embodiments, determining the plurality of blockchain node identifiers may comprise the system designating the respective blockchain node identifier for each of the plurality of blockchain nodes and configuring each of the plurality of blockchain nodes to output the respective blockchain node identifier in response to a blockchain operation. For example, in some blockchain networks, nodes do not have unique identification at the time of creation. The system may trigger the blockchain nodes to output an identifier (e.g., in response to a query to the node). The output may comprise a test string encoded within the output that identifies the blockchain node.

At step 904, process 900 (e.g., using one or more components described above) establishes a session with the first blockchain node. For example, the system may, based on designating the first blockchain node of the plurality of blockchain nodes as having the first node type, establish a session with the first blockchain node. For example, the system may establish a sticky session while reading from the master nodes so that the queries are served by the same node. In such as case, the system may use a load balancer to create an affinity between the system and a specific blockchain node for the duration of a session. For example, establishing a sticky session offers a number of benefits that can improve performance, including minimizing data exchange (e.g., servers within the system do not need to exchange session data) and better utilize cache (e.g., resulting in better responsiveness). For example, the system may use a blockchain node identifier to route all requests to a specific blockchain node.

In some embodiments, the system may also designate a fallback node. For example, the system may enable a sticky session while reading from the master node so that the queries are served by the same node (and fall back to a different node when the previous one goes unhealthy). For example, the system may designate a fourth blockchain node as having the first node type. The system may detect a failure in maintaining the session with the first blockchain node. The system may, in response to detecting the failure in maintaining the session with the first blockchain node, re-establish the session with the fourth blockchain node.

At step 906, process 900 (e.g., using one or more components described above) determines an order of a first block and a second block. For example, the system may, while maintaining the session, determine an order of a first block and a second block on a canonical chain of the blockchain network. In some embodiments, the system may retrieve a first blockchain node identifier of the first blockchain node. The system may transmit a first query to the first blockchain node based on the first blockchain node identifier, wherein the first query comprises a request to identify a plurality of blocks on the canonical chain of the blockchain network. The system may receive a first response to the first query, wherein the first response identifies the first block and the second block on the canonical chain, and wherein the first response identifies the order of the first block and the second block on the canonical chain. For example, the system may first select a plurality of nodes comprising designated master nodes and slave nodes. The system uses the master nodes to query the information as to what blocks are on the canonical chains.

In some embodiments, the system may utilize an ABI to call multiple blocks. For example, to improve the efficiency and speed of the query, the system may use a batch API to query a range of blocks, without requesting the full transaction objects. For example, batch calls allow API applications to make multiple API calls within a single API call. In addition, each call may designate multiple blocks meaning that the batch API call generate less traffic and/or gas fees. In such cases, the system may generate a batch application programming interface call to query a range of blocks of the canonical chain, wherein the range of blocks comprises the first block and the second block. The system may transmit the batch application programming interface call to the first blockchain node.

At step 908, process 900 (e.g., using one or more components described above) designates a second blockchain node and a third blockchain node as having a second node type. For example, the system may, while maintaining the session, designate a second blockchain node and a third blockchain node of the plurality of blockchain nodes as having a second node type. For example, the system may designate a first node as a plurality of slave nodes.

At step 910, process 900 (e.g., using one or more components described above) transmits, in parallel, queries to the second blockchain node and the third blockchain node. For example, the system may, while maintaining the session, based on designating the second blockchain node and the third blockchain node of the plurality of blockchain nodes as having the second node type, transmit, in parallel, queries to the second blockchain node and the third blockchain node for first on-chain data from the first block and second on-chain data from the second block, respectively.

In some embodiments, when transmitting, in parallel, the queries to the second blockchain node and the third blockchain node, the system may retrieve blockchain node identifiers. For example, the system may retrieve a second blockchain node identifier of the second blockchain node. The system may transmit a second query to the second blockchain node based on the second blockchain node identifier, wherein the second query comprises a request for the first on-chain data from the first block. The system may retrieve a third blockchain node identifier of the third blockchain node. The system may transmit a third query to the third blockchain node based on the third blockchain node identifier, wherein the third query comprises a request for the second on-chain data from the second block. For example, once the block identifiers on the canonical chain are resolved from the master nodes, the system may extract the full blocks in parallel, and/or out of order, from the slave nodes, which may be backed by a pool of load-balanced nodes.

In some embodiments, when transmitting, in parallel, the queries to the second blockchain node and the third blockchain node, the system may use one or more processing metrics. The processing metrics may be based on characteristics of the blockchain nodes, such as costs related to each node, current loads on each node, security levels of each node, etc. For example, the system may retrieve a processing metric indicating a current load on the second blockchain node. The system may compare the processing metric to threshold metric (e.g., based on a predetermined level, load on other nodes, etc.). In response to determining that the processing metric does not equal or exceed the threshold metric, the system may select to query the second blockchain node for the second on-chain data.

At step 912, process 900 (e.g., using one or more components described above) receives the first on-chain data or the second on-chain data. For example, the system may, while maintaining the session, receive the first on-chain data or the second on-chain data.

In some embodiments, the system may receive the first on-chain data or the second on-chain data, at a blockchain-interface layer, the first on-chain data, wherein the first on-chain data comprises hexadecimal encoded data from the first block of the blockchain network, wherein the blockchain-interface layer transforms, using a first compute engine, the first on-chain data to a first format, and wherein the first format comprises data types with field names identified by a respective integer. For example, the system may use multiple layers (or layered programs to introduce technical efficiencies into the indexing process). Each layer may comprise separate functional components that interact with other layers in a sequential and/or hierarchical manner. In some embodiments, each layer may interface only with a layer above it and the layer below it (e.g., in the programming stack).

At step 914, process 900 (e.g., using one or more components described above) indexes, in a first dataset, the first on-chain data or the second on-chain data based on the order. For example, the system may, in response to receiving the first on-chain data or the second on-chain data, index, in a first dataset, the first on-chain data or the second on-chain data based on the order of the first block and the second block on the canonical chain.

For example, the system may determine locations on a canonical chain based on the blocks when indexing the first on-chain data or the second on-chain data based on the order of the first block and the second block on the canonical chain. For example, the system may receive a second response to the second query, wherein the second response comprises the first on-chain data. The system may determine a first location on the canonical chain corresponding to the first block. The system may label the first on-chain data as corresponding to the first location in the first dataset. The system may receive a third response to the third query, wherein the third response comprises the second on-chain data. The system may determine a second location on the canonical chain corresponding to the second block. The system may label the second on-chain data as corresponding to the second location in the first dataset.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

Figure 10:
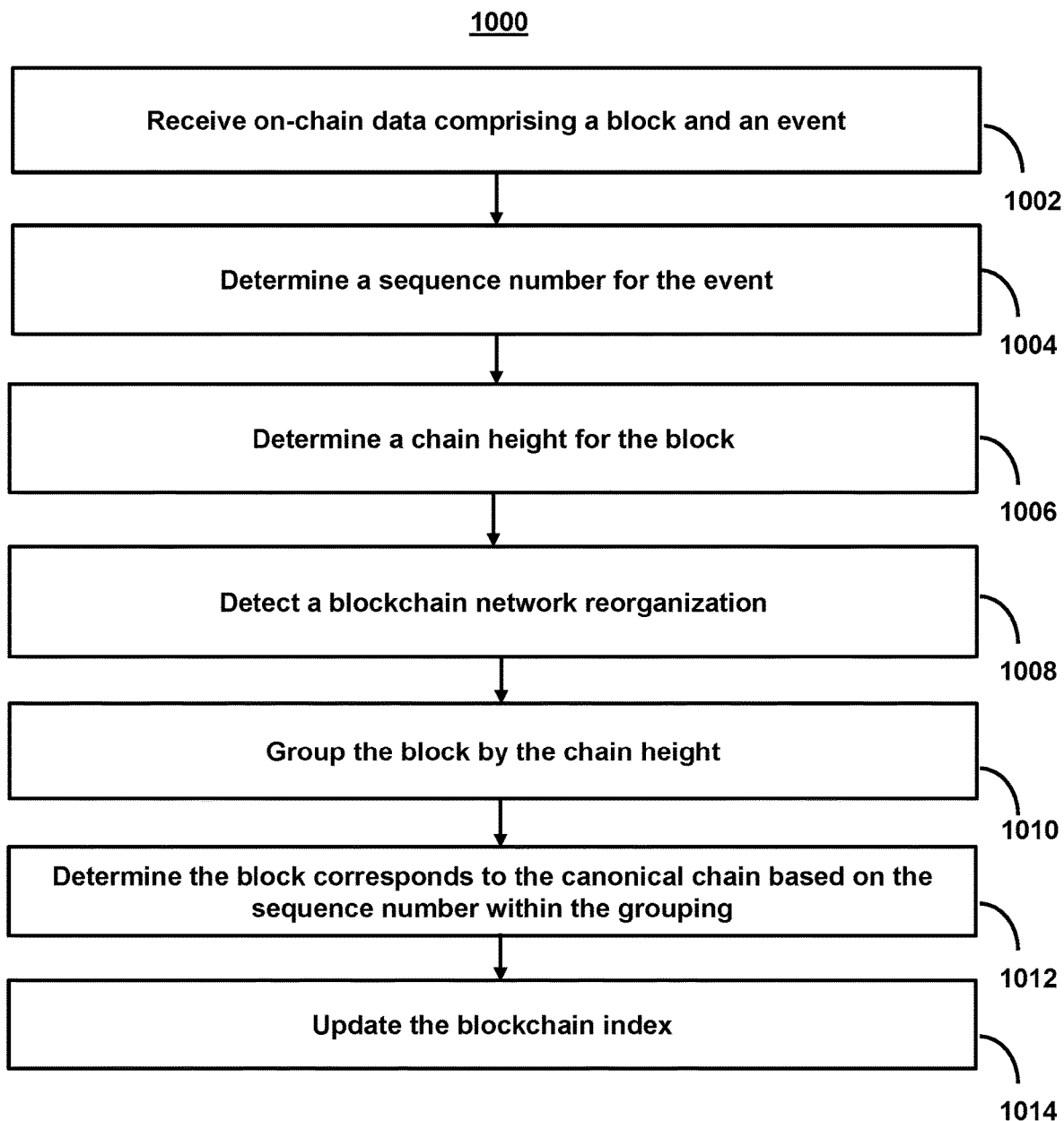
FIG. 10 shows a flowchart of the steps involved in creating a reorganization-immune blockchain index using mono-increasing sequence records, in accordance with one or more embodiments.

FIG. 10 shows a flowchart of the steps involved in creating a reorganization-immune blockchain index using mono-increasing sequence records, in accordance with one or more embodiments.

At step 1002, process 1000 (e.g., using one or more components described above) receives on-chain data comprising a block and an event. For example, the system may receive on-chain data for a plurality of blocks, wherein the plurality of blocks comprises a first block comprising a first event of a plurality of blockchain events within the on-chain data. Additionally, or alternatively, the plurality of blocks may further comprise a second block comprising a second event of the plurality of blockchain events within the on-chain data. For example, the first event and/or the second event may comprise on-chain events (e.g., transactions) and/or blockchain operations.

At step 1004, process 1000 (e.g., using one or more components described above) determines a sequence number for the event. For example, the system may determine a first sequence number for the first event. Additionally, or alternatively, the system may determine a second sequence number for the second event. For example, instead of overwriting data in the dataset when a change is detected, the system may model the changes as a strictly ordered sequence of added (+) or removed (−) events. As such, each event may be associated with a mono-increasing sequence number, making it easier to implement the change-data-capture pattern in later steps. For example, change-data-capture is a software process that identifies and tracks changes to data in a database. Change-data-capture provides real-time or near-real-time movement of data by moving and processing data continuously as new database events occur. Notably, such processes are not conventionally available to blockchain data. As such, the system may perform a data integration process in which data is extracted from various sources (e.g., various blocks in one or more blockchains) and delivered to a data lakehouse, data warehouse, database, and/or data lake. By doing so, the system may receive the benefits of change-data-capture processes. For example, in high-velocity data environments where time-sensitive decisions are made, change-data-capture allows the system to achieve low-latency, reliable, and scalable data replication, as well as zero-downtime migrations to cloud resources. In the present case, this also allows the system to rapidly update the index during reorganizations. As this can be done in real-time, the index becomes reorganization-immune.

The system may assign the sequence number based on numerous methods. For example, the system may assign the first sequence number to the first event based on an order in which the first event was received by an indexing application. For example, the sequence in which the event was received by the indexing application may differ from a sequence in which the event happened. For example, the system may receive events out of order as data is extracted from different blocks from a plurality of slave nodes. Additionally, or alternatively, the system may assign the first sequence number to the first event based on an order of the first block and a second block on the canonical chain of the blockchain network. For example, the system may determine the sequence number based on an order in a canonical chain of a blockchain network. In some embodiments, the system may receive this order from a blockchain node processing pool. The system may use a version of master/slave processing. For example, once the block identifiers on the canonical chain are resolved from the master nodes, the system may extract the full blocks in parallel, and/or out of order, from the slave nodes, which may be backed by a pool of load-balanced nodes.

At step 1006, process 1000 (e.g., using one or more components described above) determines a chain height for the block. For example, the system may determine a first chain height for the first block. Additionally, or alternatively, the system may determine a second chain height for the second block. For example, the block height chain height of a particular block is defined as the number of blocks preceding it in the blockchain. In some embodiments, the chain height can either reference the location of a transaction that has been completed in the past's location in the blockchain, or refer to the present length, block location within a chain, and/or size of a blockchain.

At step 1008, process 1000 (e.g., using one or more components described above) detects a blockchain network reorganization. For example, the system may detect a blockchain network reorganization. For example, the system may receive a system update based on manual user input indicating that a blockchain network has undergone a reorganization event. Alternatively, or additionally, the system may detect a blockchain reorganization based on detecting a fork in the blockchain network. For example, a chain reorganization (or "reorg") takes place when a node receives blocks that are part of a new longest chain. The node will then deactivate blocks in its old longest chain in favor of the blocks that build the new longest chain.

The system may detect the blockchain network reorganization using numerous methods. For example, a chain reorganization may occur after two blocks have been mined at the same time. Due to the propagation speed of blocks across the blockchain network, some nodes will receive the one block first, and some nodes will receive the other block first. Therefore, there will be a disagreement about which of these blocks was actually "first" and belongs at the top of the blockchain. The next block to be mined will build on top of one of these blocks, creating a new longest chain. When nodes receive this newest block, the nodes will see that it creates a new longest chain, and will each perform a chain reorganization to adopt it. Transactions inside blocks that are deactivated due to a chain reorganization (also known as "orphan blocks") are no longer part of the transaction history of the blockchain. In such cases, the system may receive a first notification from a first blockchain node identifying a last minted block for the blockchain network. The system may then determine that a previously minted block corresponds to an orphan chain of the blockchain network.

Additionally, or alternatively, a chain reorganization may occur based on detecting a soft fork or a hard fork. In blockchain technology, a soft fork is a change to the software protocol where only previously valid transaction blocks are made invalid. Because old nodes will recognize the new blocks as valid, a soft fork is backwards-compatible. This kind of fork requires only a majority of the miners upgrading to enforce the new rules. In contrast, a hard fork is a radical change to a network's protocol that makes previously invalid blocks and transactions valid, or vice-versa. A hard fork requires all nodes or users to upgrade to the latest version of the protocol software. In such cases, the system may receive a second notification indicating enforcement of a new rule by a subset of miners on the blockchain network. The system may determine that the subset is a majority of miners on the blockchain network.

Additionally, or alternatively, the system may follow a master node (either backed by a single node or a cluster of nodes with sticky session enabled). For example, in a conventional system, the indexing application may always follow the longest chain at any given point in time. In contrast, when the state of a master node diverges from the internal state, the system detects a fork and then updates the internal state to match the node's state. In such a case, the system may designate a first blockchain node of a plurality of blockchain nodes for the blockchain network as having a first node type (e.g., as described above). The system may then receive a third notification, from the first blockchain node, identifying a new canonical chain.

At step 1010, process 1000 (e.g., using one or more components described above) groups the block by the chain height. For example, the system may, in response to the blockchain network reorganization, determine whether the first sequence number corresponds to a highest sequence number among respective sequence numbers for the plurality of blocks that have the first chain height. Additionally, or alternatively, the system may determine whether the second sequence number corresponds to a highest sequence number among respective sequence numbers for the plurality of blocks that have the second chain height.

To perform the grouping and/or determine whether the first sequence number corresponds to the highest sequence number among respective sequence numbers for the plurality of blocks that have the first chain height, the system may retrieve respective sequence numbers for the plurality of blocks that have the first chain height. The system may rank the respective sequence numbers based on value. The system may determine that the first sequence number corresponds to the highest sequence number based on the ranking.

At step 1012, process 1000 (e.g., using one or more components described above) determines the block corresponds to the canonical chain based on the sequence number within the grouping. For example, the system may, in response to the blockchain network reorganization, determine that the first block corresponds to a canonical chain for a blockchain network based on determining that the first sequence number corresponds to the highest sequence number among respective sequence numbers for the plurality of blocks that have the first chain height. Additionally, or alternatively, the system may determine that the second block corresponds to the canonical chain for the blockchain network based on determining that the second sequence number corresponds to the highest sequence number among respective sequence numbers for the plurality of blocks that have the second chain height.

At step 1014, process 1000 (e.g., using one or more components described above) updates the blockchain index. For example, the system may update a blockchain index to indicate that the first block corresponds to the canonical chain. Additionally, or alternatively, the system may update the blockchain index to indicate that the second block corresponds to the canonical chain.

In contrast, the system may designate a block as being orphaned. For example, the system may determine that the second block does not correspond to the canonical chain for the blockchain network based on determining that the second sequence number does not correspond to the highest sequence number among respective sequence numbers for the plurality of blocks that have the second chain height. In response to determining that the second block does not correspond to the canonical chain for the blockchain network, the system may update the blockchain index to indicate that the second block corresponds to an orphan chain. For example, a canonical chain may be the chain which is agreed to be the "main" chain by a consensus protocol. Blocks are "orphaned" when they are in one of the "side" chains.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 10.

Figure 11:
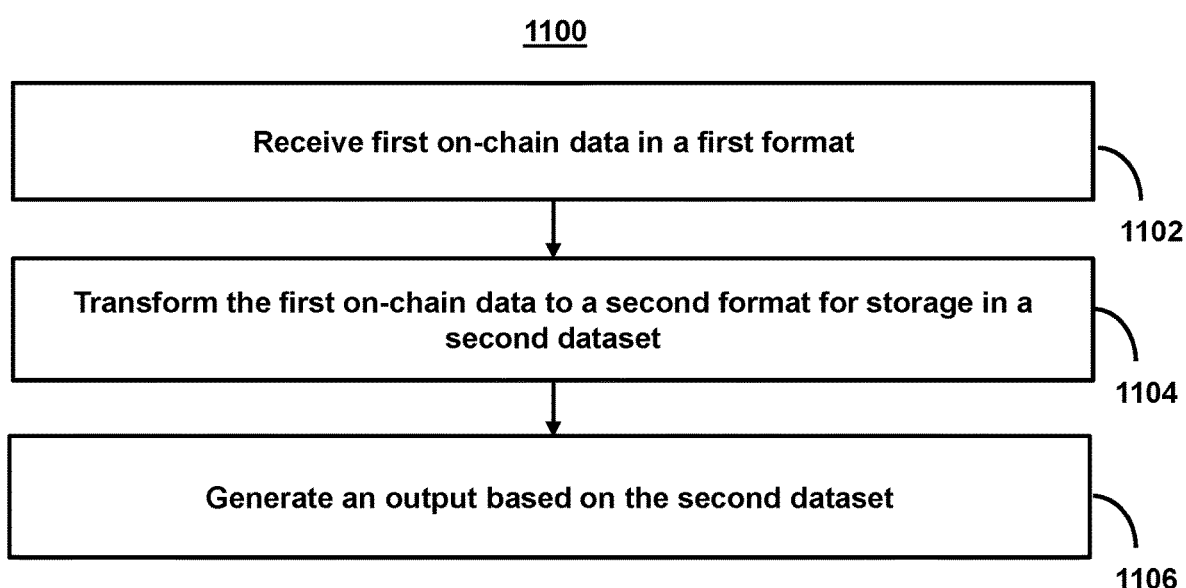
FIG. 11 shows a flowchart of the steps involved in supporting both batch processing and streaming data applications, to load and process data incrementally, while providing a near-constantly materialized dataset based on raw blockchain data, in accordance with one or more embodiments.

FIG. 11 shows a flowchart of the steps involved in supporting both batch processing and streaming data applications, to load and process data incrementally, while providing a near-constantly materialized dataset based on raw blockchain data, in accordance with one or more embodiments.

At step 1102, process 1100 (e.g., using one or more components described above) receives first on-chain data in a first format. For example, the system may receive, at a data lakehouse layer, first on-chain data in a first format via a first input stream, wherein the first on-chain data originates from a blockchain node of a blockchain network. For example, while the first dataset may comprise structured on semi-structured raw blockchain data, and thus delay error-prone parsing and data augmentation until later, raw blockchain data (even in a structured or semi-structured format) is difficult to use to run applications. For example, to speed up the reprocessing of the raw blockchain data, the system may build different batch processing pipelines; however, the underlying code cannot be reused for streaming processing. As such, the data lakehouse layer may comprise a different data structure type. A data lakehouse is a data solution concept that combines elements of the data warehouse with those of the data lake. Data lakehouses implement data warehouses' data structures and management features for data lakes, which are typically more cost-effective for data storage.

In some embodiments, the first on-chain data may first be processed through one or more layers. For example, the system may receive, at a blockchain-interface layer, the first on-chain data from the blockchain node of the blockchain network, wherein the first on-chain data comprises hexadecimal encoded data from a first block of the blockchain network. The system may then transform the first on-chain data to the first format, using a first compute engine, for storage in a first dataset, wherein the first format comprises data types with field names identified by a respective integer, wherein the first compute engine comprises a first workflow architecture, and wherein the first workflow architecture comprises a first threshold for workflow throughout and a first threshold for a number of workflows.

At step 1104, process 1100 (e.g., using one or more components described above) transforms the first on-chain data to a second format for storage in a second dataset. For example, the system may transform the first on-chain data to a second format for storage in a second dataset. For example, the second dataset may comprise a columnar oriented format, which is best fitted for analytic workloads. For example, the second dataset may represent a cleansed and partitioned dataset (e.g., in contrast to the first dataset, which may comprise raw blockchain data, and the third dataset, which may be curated based on application use cases). For example, the columnar oriented format may preserve local copies (files) of remote data on worker nodes, which may avoid remote reads during instances of a high-volume of event processing.

The second format may comprise an unbounded table. For example, using an unbounded table allows for new data to be quickly integrated into the existing dataset. For example, new data arriving as an unbounded input table, wherein every new item in the data stream is treated as a new column (or row) in the table.

Additionally or alternatively, the second format may comprise a columnar oriented format. For example, appending the first new on-chain data to the unbounded table as the micro batch may comprise adding a new column to the unbounded table. Instead of keeping a record of every column in a table in a single row, a column-oriented database, and in particular, an unbounded table, may store the data for each column in a single column. The main benefit of a columnar database is faster performance compared to a row-oriented one because it accesses less memory to output data. For example, by doing so, the system may treat all the data arriving (e.g., in an input stream) as an unbounded input table, wherein every new item in the data stream is treated as a new column (or row) in the table. By using the columnar format, only the data needed by a query is loaded into memory. Limiting the amount of data loaded into memory is important from a performance point of view because a typical application only needs to read a small portion of the second dataset (e.g., a balance indexer only cares about the monetary activities). Thus, the use of the columnar format provides performance benefits.

Transforming the first on-chain data to the second format may comprise the system performing numerous steps. For example, the system may detect first new on-chain data in the first input stream. The system may then append the first new on-chain data to the unbounded table as a micro batch. For example, the system may use micro batches to improve performance speed and provide a near-constantly materialized dataset. Micro batch processing is the practice of collecting data in small groups ("batches") for the purposes of taking action on ("processing") that data. In contrast, conventional system may use "batch processing," which involves taking action on a large group of data. Micro batch processing is a variant of traditional batch processing in that the data processing occurs more frequently so that smaller groups of new data are processed. The system may then store the first new on-chain data in the second dataset.

Additionally, or alternatively, transforming the first on-chain data to the second format may comprise modifying existing on-chain data in the unbounded table. For example, the system may detect second new on-chain data in the first input stream. The system may modify existing on-chain data in the unbounded table based on the second new on-chain data. The system may store the second new on-chain data in the second dataset. For example, while the system may append a delta table upon detecting new data, the use of the data lakehouse, in particular the features of the data lake, supports upsert and change data feed operations. These operations may be used to updated transaction-canonical-view tables and/or indicate canonical chains.

Additionally, or alternatively, transforming the first on-chain data to the second format may comprise modifying existing on-chain data in the unbounded table using specific functions. For example, the system may detect third new on-chain data in the first input stream. The system may modify existing on-chain data in the unbounded table based on the third new on-chain data using a single call to insert or update the existing on-chain data in the unbounded table.

The system may store the third new on-chain data in the second dataset. For example, while the system may append the delta table upon detecting new data, the use of the data lakehouse, in particular the features of the data lake, supports upsert and change data feed operations. These operations may be used to update transaction-canonical-view tables and/or indicate canonical chains. For example, using the upsert operation, the system can either insert or update an existing record in one call. To determine whether a record already exists, the upsert statement and/or the system uses the record's identifier as the key to match records, a custom external identifier field, or a standard field (e.g., with an idLookup attribute set to true).

Additionally or alternatively, transforming the first on-chain data to the second format may comprise modifying existing on-chain data based on detecting a blockchain network reorganization. For example, the system may detect a blockchain network reorganization. For example, the system may receive a system update based on manual user input indicating that a blockchain network has undergone a reorganization event. Alternatively, or additionally, the system may detect a blockchain reorganization based on detecting a fork in the blockchain network. For example, a chain reorg takes place when a node receives blocks that are part of a new longest chain. The node will then deactivate blocks in its old longest chain in favor of the blocks that build the new longest chain. The system may then modify existing on-chain data in the unbounded table based on the blockchain network reorganization. For example, the system may provide a canonical view of the blockchain state, where new transactions are inserted and orphaned transactions are soft deleted. As such, the system may detect a reorganization event and update data in the second dataset to reflect that one or more transactions are orphaned.

Additionally, or alternatively, transforming the first on-chain data to the second format may comprise modifying existing on-chain data based on detecting a blockchain network reorganization. For example, the system may provide a canonical view of the blockchain state, where new transactions are inserted and orphaned transactions are soft deleted. As such, the system may detect a reorganization event and update data in the second dataset to reflect that one or more transactions are orphaned.

At step 1106, process 1100 (e.g., using one or more components described above) generates an output based on the second dataset. For example, the system may output delta tables based on data received (e.g., in an input stream) from the first dataset. The output may comprise adds and deletes tables for the second dataset, which may comprise a delta table because it stores changes made to the second dataset.

For example, the system may provide numerous advantages through the use of the second format and/or specific outputs. For example, the system may receive, via an application service layer, a static table query. The system may process the static table query using the second dataset. For example, static tables are the master tables that are populated with canned data at the time of creation of the database in a typical system setup. For example, static data refers to a fixed data set—or, data that remains the same after it is collected. Dynamic data, on the other hand, continually changes after it is recorded in order to maintain its integrity. However, as the system has reformatted the dynamic blockchain data, the system may receive queries on this conceptual input table that can be defined as if it were a static table. For example, the system may automatically convert this batch-like query to a streaming execution plan (e.g., via incrementalization). That is, the system determines what state needs to be maintained to update the result each time a new micro batch arrives. As such, the system allows for better integration of blockchain data with non-blockchain systems.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 11.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising: receiving, at a blockchain-interface layer, first on-chain data from a blockchain node of a blockchain network, wherein the first on-chain data comprises hexadecimal encoded data from a first block of the blockchain network, wherein the blockchain-interface layer transforms the first on-chain data to a first format, using a first compute engine, for storage in a first dataset, and wherein the first format comprises data types with field names identified by a respective integer; receiving, at a data lakehouse layer, the first on-chain data in the first format, wherein the data lakehouse layer transforms the first on-chain data to a second format, using a second compute engine, for storage in a second dataset, wherein the second format comprises a columnar oriented format, wherein the second dataset comprises the first on-chain data and second on-chain data, and wherein the second on-chain data is from a second block on the blockchain network; determining an application characteristic for an application that performs blockchain operations using the first on-chain data or the second on-chain data; receiving, at an application service layer, the first on-chain data and the second on-chain data in the second format, wherein the application service layer transforms, using a third compute engine, the first on-chain data and the second on-chain data to a third format for storage in a third dataset, and wherein the third format is dynamically selected based on the application characteristic; and transmitting the first on-chain data and the second on-chain data in the third format to the application.
2. The method of the preceding embodiment, wherein the method is for improved blockchain data indexing by decoupling compute and storage layers.
3. The method of any one of the preceding embodiments, wherein determining the application characteristic further comprises: determining a data freshness requirement for the application; and selecting the third format from a plurality of formats based on the third format corresponding to the data freshness requirement.

4. The method of any one of the preceding embodiments, further comprising: receiving a request, from the application, for the first on-chain data and the second on-chain data; and selecting between the blockchain node, the first dataset, the second dataset, and the third dataset for responding to the request based on the application characteristic.

5. The method of any one of the preceding embodiments, wherein the data lakehouse layer comprises a combination of a data lake with a data warehouse in a single data platform.

6. The method of any one of the preceding embodiments, wherein transforming the first on-chain data to the first format comprises: receiving unstructured on-chain data; determining a structuring condition based on the first format; and applying the structuring condition to the unstructured on-chain data to generate structured on-chain data.

7. The method of any one of the preceding embodiments, wherein transforming the first on-chain data to the first format comprises: receiving unstructured on-chain data; parsing the unstructured on-chain data for an unstructured on-chain data characteristic; and generating a semantic marker for the unstructured on-chain data characteristic, wherein the semantic marker is stored in the first dataset.

8. The method of any one of the preceding embodiments, wherein receiving the first on-chain data from the blockchain node comprises: selecting the first block of the blockchain network; querying the first block for available data matching a retrieval criterion; and executing a retrieval operation to retrieve any available data matching the retrieval criterion.

9. The method of any one of the preceding embodiments, wherein: the first compute engine comprises a first workflow architecture, wherein the first workflow architecture comprises a first threshold for workflow throughout and a first threshold for a number of workflows; wherein the second compute engine comprises a second workflow architecture, wherein the second workflow architecture comprises a second threshold for workflow throughout and a second threshold for the number of workflows, wherein the second threshold for workflow throughput is higher than the first threshold for workflow throughput, and wherein the second threshold for the number of workflows is lower than the first threshold for the number of workflows; and wherein the third compute engine comprises the second workflow architecture.

10. The method of any one of the preceding embodiments, wherein the first dataset maintains the first on-chain data as the hexadecimal encoded data while in the first format, and wherein the second dataset does not maintain the first on-chain data as the hexadecimal encoded data while in the second format.

11. The method of any one of the preceding embodiments, further comprising: designating a first blockchain node of a plurality of blockchain nodes for a blockchain network as having a first node type; and based on designating the first blockchain node of the plurality of blockchain nodes as having the first node type, establishing a session with the first blockchain node.

12. A method, the method comprising: designating a first blockchain node of a plurality of blockchain nodes for a blockchain network as having a first node type; based on designating the first blockchain node of the plurality of blockchain nodes as having the first node type, establishing a session with the first blockchain node; while maintaining the session: determining an order of a first block and a second block on a canonical chain of the blockchain network; designating a second blockchain node and a third blockchain node of the plurality of blockchain nodes as having a second node type; based on designating the second blockchain node and the third blockchain node of the plurality of blockchain nodes as having the second node type, transmitting, in parallel, queries to the second blockchain node and the third blockchain node for first on-chain data from the first block and second on-chain data from the second block, respectively; receiving the first on-chain data or the second on-chain data; and in response to receiving the first on-chain data or the second on-chain data, indexing, in a first dataset, the first on-chain data or the second on-chain data based on the order of the first block and the second block on the canonical chain.

13. The method of any one of the preceding embodiments, wherein the method is for improved blockchain data indexing by decoupling compute and storage layers.

14. The method of any of the preceding embodiments, wherein indexing the first on-chain data or the second on-chain data based on the order of the first block and the second block on the canonical chain further comprises: receiving a second response to the second query, wherein the second response comprises the first on-chain data; determining a first location on the canonical chain corresponding to the first block; labeling the first on-chain data as corresponding to the first location in the first dataset; receiving a third response to the third query, wherein the third response comprises the second on-chain data; determining a second location on the canonical chain corresponding to the second block; and labeling the second on-chain data as corresponding to the second location in the first dataset.

15. The method of any one of the preceding embodiments, wherein transmitting, in parallel, the queries to the second blockchain node and the third blockchain node further comprises: retrieving a second blockchain node identifier of the second blockchain node; transmitting a second query to the second blockchain node based on the second blockchain node identifier, wherein the second query comprises a request for the first on-chain data from the first block; retrieving a third blockchain node identifier of the third blockchain node; and transmitting a third query to the third blockchain node based on the third blockchain node identifier, wherein the third query comprises a request for the second on-chain data from the second block.

16. The method of any one of the preceding embodiments, wherein transmitting, in parallel, the queries to the second blockchain node and the third blockchain node further comprises: retrieving a processing metric indicating a current load on the second blockchain node; comparing the processing metric to threshold metric; and in response to determining that the processing metric does not equal or exceed the threshold metric, selecting to query the second blockchain node for the second on-chain data.

17. The method of any one of the preceding embodiments, wherein determining the order of the first block and the second block on the canonical chain of the blockchain network further comprises: retrieving a first blockchain node identifier of the first blockchain node; transmitting a first query to the first blockchain node based on the first blockchain node identifier, wherein the first query comprises a request to identify a plurality of blocks on the canonical chain of the blockchain network; and receiving a first response to the first query, wherein the first response identifies the first block and the second block on the canonical chain, and wherein the first response identifies the order of the first block and the second block on the canonical chain.
18. The method of any one of the preceding embodiments, further comprising: identifying a plurality of blockchain nodes for the blockchain network; and determining a plurality of blockchain node identifiers, wherein the plurality of blockchain node identifiers comprises a respective blockchain node identifier for each of the plurality of blockchain nodes.
19. The method of any one of the preceding embodiments, wherein determining the plurality of blockchain node identifiers comprises: designating the respective blockchain node identifier for each of the plurality of blockchain nodes; and configuring each of the plurality of blockchain nodes to output the respective blockchain node identifier in response to a blockchain operation.
20. The method of any of the preceding embodiments, further comprising: designating a fourth blockchain node as having the first node type; detecting a failure in maintaining the session with the first blockchain node; and in response to detecting the failure in maintaining the session with the first blockchain node, re-establishing the session with the fourth blockchain node.
21. The method of any one of the preceding embodiments, wherein determining the order of the first block and the second block on the canonical chain of the blockchain network further comprises: generating a batch application programming interface call to query a range of blocks of the canonical chain, wherein the range of blocks comprises the first block and the second block; and transmitting the batch application programming interface call to the first blockchain node.
22. The method of any one of the preceding embodiments, further comprising receiving, at a blockchain-interface layer, the first on-chain data, wherein the first on-chain data comprises hexadecimal encoded data from the first block of the blockchain network, wherein the blockchain-interface layer transforms, using a first compute engine, the first on-chain data to a first format, and wherein the first format comprises data types with field names identified by a respective integer.
23. A method, the method comprising: receiving on-chain data for a plurality of blocks, wherein the plurality of blocks comprises a first block comprising a first event of a plurality of blockchain events within the on-chain data; determining a first sequence number for the first event; determining a first chain height for the first block; detecting a blockchain network reorganization; in response to the blockchain network reorganization: determining whether the first sequence number corresponds to a highest sequence number among respective sequence numbers for the plurality of blocks that have the first chain height; determining that the first block corresponds to a canonical chain for a blockchain network based on determining that the first sequence number corresponds to the highest sequence number among respective sequence numbers for the plurality of blocks that have the first chain height; and updating a blockchain index to indicate that the first block corresponds to the canonical chain.
24. The method of any one of the preceding embodiments, wherein the method is for creating a reorganization-immune blockchain index using mono-increasing sequence records.
25. The method of any one of the preceding embodiments, wherein the plurality of blocks further comprises a second block comprising a second event of the plurality of blockchain events within the on-chain data, and wherein the method further comprises: determining a second sequence number for the second event; determining a second chain height for the second block; and determining whether the second sequence number corresponds to a highest sequence number among respective sequence numbers for the plurality of blocks that have the second chain height.
26. The method of any one of the preceding embodiment, further comprising: determining that the second block corresponds to the canonical chain for the blockchain network based on determining that the second sequence number corresponds to the highest sequence number among respective sequence numbers for the plurality of blocks that have the second chain height; and updating the blockchain index to indicate that the second block corresponds to the canonical chain.
27. The method of any one of the preceding embodiments, further comprising: determining that the second block does not correspond to the canonical chain for the blockchain network based on determining that the second sequence number does not correspond to the highest sequence number among respective sequence numbers for the plurality of blocks that have the second chain height; and in response to determining that the second block does not correspond to the canonical chain for the blockchain network, updating the blockchain index to indicate that the second block corresponds to an orphan chain.
28. The method of any one of the preceding embodiments, wherein the first sequence number is assigned to the first event based on an order in which the first event was received by an indexing application.
29. The method of any one of the preceding embodiments, wherein the first sequence number is assigned to the first event based on an order of the first block and a second block on the canonical chain of the blockchain network.
30. The method of any one of the preceding embodiments, wherein detecting the blockchain network reorganization comprises: receiving a first notification from a first blockchain node identifying a last minted block for the blockchain network; and determining that a previously minted block corresponds to an orphan chain of the blockchain network.
31. The method of any one of the preceding embodiments, wherein detecting the blockchain network reorganization comprises: receiving a second notification indicating an enforcement of a new rule by a subset of miners on the blockchain network; and determining that the subset is a majority of miners on the blockchain network.
32. The method of any one of the preceding embodiments, wherein detecting the blockchain network reorganization comprises: designating a first blockchain node of a plurality of blockchain nodes for the blockchain network as having a first node type; and receiving a third notification, from the first blockchain node, identifying a new canonical chain.

33. The method of any one of the preceding embodiments, wherein determining whether the first sequence number corresponds to the highest sequence number among respective sequence numbers for the plurality of blocks that have the first chain height further comprises: retrieving respective sequence numbers for the plurality of blocks that have the first chain height; ranking the respective sequence numbers based on value; and determining that the first sequence number corresponds to the highest sequence number based on the ranking.

34. A method, the method comprising: receiving, at a data lakehouse layer, first on-chain data in a first format via a first input stream, wherein the first on-chain data originates from a blockchain node of a blockchain network; transforming the first on-chain data to a second format for storage in a second dataset, wherein the second format comprises an unbounded table, and wherein transforming the first on-chain data to the second format comprises: detecting first new on-chain data in the first input stream; appending the first new on-chain data to the unbounded table as a micro batch; and storing the first new on-chain data in the second dataset; and generating an output based on the second dataset.

35. The method of any one of the preceding embodiments, wherein the method is for supporting both batch processing and streaming data applications, to load and process data incrementally, while providing a near-constantly materialized dataset based on raw blockchain data.

36. The method of any one of the preceding embodiments, further comprising: receiving, via an application service layer, a static table query; and processing the static table query using the second dataset.

37. The method of any one of the preceding embodiments, wherein transforming the first on-chain data to the second format further comprises: detecting second new on-chain data in the first input stream; modifying existing on-chain data in the unbounded table based on the second new on-chain data; and storing the second new on-chain data in the second dataset.

38. The method of any one of the preceding embodiments, wherein transforming the first on-chain data to the second format further comprises: detecting third new on-chain data in the first input stream; modifying existing on-chain data in the unbounded table based on the third new on-chain data using a single call to insert or update the existing on-chain data in the unbounded table; and storing the third new on-chain data in the second dataset.

39. The method of any one of the preceding embodiments, wherein transforming the first on-chain data to the second format further comprises: detecting a blockchain network reorganization; and modifying existing on-chain data in the unbounded table based on the blockchain network reorganization.

40. The method of any one of the preceding embodiments, wherein transforming the first on-chain data to the second format further comprises: accessing an application binary interface for a smart contract corresponding to the first on-chain data; determining an on-chain event in the first on-chain data based on the application binary interface; and storing the on-chain event in the second dataset.

41. The method of any one of the preceding embodiments, further comprising: receiving, at a blockchain-interface layer, the first on-chain data from the blockchain node of the blockchain network, wherein the first on-chain data comprises hexadecimal encoded data from a first block of the blockchain network; and transforming the first on-chain data to the first format, using a first compute engine, for storage in a first dataset, wherein the first format comprises data types with field names identified by a respective integer, wherein the first compute engine comprises a first workflow architecture, and wherein the first workflow architecture comprises a first threshold for workflow throughout and a first threshold for a number of workflows.

42. The method of any one of the preceding embodiments, wherein the second dataset comprises the first on-chain data and second on-chain data, and wherein the second on-chain data is from a second block on the blockchain network.

43. The method of any one of the preceding embodiments, wherein transforming the first on-chain data to the second format for storage in the second dataset comprises using a second compute engine, wherein the second compute engine comprises a second workflow architecture, wherein the second workflow architecture comprises a second threshold for workflow throughout and a second threshold for a number of workflows, wherein the second threshold for workflow throughput is higher than the first threshold for workflow throughput, and wherein the second threshold for the number of workflows is lower than the first threshold for the number of workflows.

44. The method of any one of the preceding embodiments, wherein generating the output based on the second dataset comprises generating an append-only delta table comprising added and removed events.

45. The method of any one of the preceding embodiments, wherein the second format comprises a columnar oriented format, and wherein appending the first new on-chain data to the unbounded table as the micro batch comprises adding a new column to the unbounded table.

46. A tangible, non-transitory, machine-readable medium storing instructions that, when executed by a data processing apparatus, cause the data processing apparatus to perform operations comprising those of any of embodiments 1-45.

47. A system comprising one or more processors; and memory storing instructions that, when executed by the processors, cause the processors to effectuate operations comprising those of any of embodiments 1-45.

48. A system comprising means for performing any of embodiments 1-45.

What is claimed is:

1. A system for improved blockchain data indexing by decoupling compute and storage layers, the system comprising:
a multi-layer data platform for indexing on-chain data, the multi-layer data platform comprising one or more processors and non-transitory computer-readable media storing instructions that, when executed by the one or more processors, cause operations comprising;
populating a first dataset, wherein the first dataset is populated based on:
receiving first on-chain data from a blockchain node of a blockchain network, wherein the first on-chain data comprises hexadecimal encoded data from a first block of the blockchain network;
transforming the first on-chain data to a first format, and wherein the first format comprises data types with field names identified by a respective integer;
storing the first on-chain data, in the first dataset at a blockchain-interface layer, wherein the first dataset comprises the hexadecimal encoded data, and wherein the first dataset uses the first format; and
retrieving a first compute engine, wherein the first compute engine comprises a first workflow architecture, wherein the first workflow architecture comprises a first threshold for workflow throughout and a first threshold for a number of workflows;
populating a second dataset, wherein the second dataset is populated based on:
transforming the first on-chain data in the first format to a second format, wherein the second format comprises a columnar oriented format;
storing the first on-chain data, in the second dataset at a data lakehouse layer, wherein the second dataset comprises the first on-chain data and second on-chain data in the second format, and wherein the second on-chain data is from a second block on the blockchain network; and
retrieving a second compute engine, wherein the second compute engine comprises a second workflow architecture, wherein the second workflow architecture comprises a second threshold for workflow throughout and a second threshold for the number of workflows, wherein the second threshold for workflow throughput is higher than the first threshold for workflow throughput, and wherein the second threshold for the number of workflows is lower than the first threshold for the number of workflows; and
populating a third dataset, wherein the third dataset is populated based on:
transforming the first on-chain data and the second on-chain data to a third format, wherein the third format is selected based on an application;
storing the first on-chain data and the second on-chain data, in the third dataset at an application service layer; and
retrieving a third compute engine, wherein the third compute engine comprises the second workflow architecture.

2. A method for improved blockchain data indexing by decoupling compute and storage layers, the method comprising:
receiving, at a blockchain-interface layer, first on-chain data from a blockchain node of a blockchain network, wherein the first on-chain data comprises hexadecimal encoded data from a first block of the blockchain network, wherein the blockchain-interface layer transforms the first on-chain data to a first format, using a first compute engine, for storage in a first dataset, and wherein the first format comprises data types with field names identified by a respective integer;
receiving, at a data lakehouse layer, the first on-chain data in the first format, wherein the data lakehouse layer transforms the first on-chain data to a second format, using a second compute engine, for storage in a second dataset, wherein the second format comprises a columnar oriented format, wherein the second dataset comprises the first on-chain data and second on-chain data, and wherein the second on-chain data is from a second block on the blockchain network;
determining an application characteristic for an application that performs blockchain operations using the first on-chain data or the second on-chain data;
receiving, at an application service layer, the first on-chain data and the second on-chain data in the second format, wherein the application service layer transforms, using a third compute engine, the first on-chain data and the second on-chain data to a third format for storage in a third dataset, and wherein the third format is selected based on the application characteristic; and
transmitting the first on-chain data and the second on-chain data in the third format to the application.

3. The method of claim 2, wherein determining the application characteristic further comprises:
determining a data freshness requirement for the application; and
selecting the third format from a plurality of formats based on the third format corresponding to the data freshness requirement.

4. The method of claim 2, further comprising:
receiving a request, from the application, for the first on-chain data and the second on-chain data; and
selecting between the blockchain node, the first dataset, the second dataset, and the third dataset for responding to the request based on the application characteristic.

5. The method of claim 2, wherein the data lakehouse layer comprises a combination of a data lake with a data warehouse in a single data platform.

6. The method of claim 2, wherein transforming the first on-chain data to the first format comprises:
receiving unstructured on-chain data;
determining a structuring condition based on the first format; and
applying the structuring condition to the unstructured on-chain data to generate structured on-chain data.

7. The method of claim 2, wherein transforming the first on-chain data to the first format comprises:
receiving unstructured on-chain data;
parsing the unstructured on-chain data for an unstructured on-chain data characteristic; and
generating a semantic marker for the unstructured on-chain data characteristic, wherein the semantic marker is stored in the first dataset.

8. The method of claim 2, wherein receiving the first on-chain data from the blockchain node comprises:
selecting the first block of the blockchain network;
querying the first block for available data matching a retrieval criterion; and
executing a retrieval operation to retrieve any available data matching the retrieval criterion.

9. The method of claim 2, wherein:
the first compute engine comprises a first workflow architecture, wherein the first workflow architecture comprises a first threshold for workflow throughout and a first threshold for a number of workflows;
wherein the second compute engine comprises a second workflow architecture, wherein the second workflow architecture comprises a second threshold for workflow throughout and a second threshold for the number of workflows, wherein the second threshold for workflow throughput is higher than the first threshold for workflow throughput, and wherein the second threshold for the number of workflows is lower than the first threshold for the number of workflows; and wherein the third compute engine comprises the second workflow architecture.

10. The method of claim 2, wherein the first dataset maintains the first on-chain data as the hexadecimal encoded data while in the first format, and wherein the second dataset does not maintain the first on-chain data as the hexadecimal encoded data while in the second format.

11. The method of claim 2, further comprising:
designating a first blockchain node of a plurality of blockchain nodes for the blockchain network as having a first node type; and
based on designating the first blockchain node of the plurality of blockchain nodes as having the first node type, establishing a session with the first blockchain node.

12. One or more non-transitory computer-readable media having instructions recorded thereon that when executed by one or more processors causes operations comprising:
receiving, at a blockchain-interface layer, first on-chain data from a blockchain node of a blockchain network, wherein the first on-chain data comprises hexadecimal encoded data from a first block of the blockchain network, wherein the blockchain-interface layer transforms the first on-chain data to a first format, using a first compute engine, for storage in a first dataset, and wherein the first format comprises data types with field names identified by a respective integer;
receiving, at a data lakehouse layer, the first on-chain data in the first format, wherein the data lakehouse layer transforms the first on-chain data to a second format, using a second compute engine, for storage in a second dataset, wherein the second format comprises a columnar oriented format, wherein the second dataset comprises the first on-chain data and second on-chain data, and wherein the second on-chain data is from a second block on the blockchain network;
determining an application characteristic for an application that performs blockchain operations using the first on-chain data or the second on-chain data;
receiving, at an application service layer, the first on-chain data and the second on-chain data in the second format, wherein the application service layer transforms, using a third compute engine, the first on-chain data and the second on-chain data to a third format for storage in a third dataset, and wherein the third format is selected based on the application characteristic; and
transmitting the first on-chain data and the second on-chain data in the third format to the application.

13. The one or more non-transitory computer-readable media of claim 12, wherein determining the application characteristic further comprises:
determining a data freshness requirement for the application; and
selecting the third format from a plurality of formats based on the third format corresponding to the data freshness requirement.

14. The one or more non-transitory computer-readable media of claim 12, wherein the instructions further cause an operation comprising:

receiving a request, from the application, for the first on-chain data and the second on-chain data; and
selecting between the blockchain node, the first dataset, the second dataset, and the third dataset for responding to the request based on the application characteristic.

15. The one or more non-transitory computer-readable media of claim 12, wherein the data lakehouse layer comprises a combination of a data lake with a data warehouse in a single data platform.

16. The one or more non-transitory computer-readable media of claim 12, wherein transforming the first on-chain data to the first format comprises:
receiving unstructured on-chain data;
determining a structuring condition based on the first format; and
applying the structuring condition to the unstructured on-chain data to generate structured on-chain data.

17. The one or more non-transitory computer-readable media of claim 12, wherein transforming the first on-chain data to the first format comprises:
receiving unstructured on-chain data;
parsing the unstructured on-chain data for an unstructured on-chain data characteristic; and
generating a semantic marker for the unstructured on-chain data characteristic, wherein the semantic marker is stored in the first dataset.

18. The one or more non-transitory computer-readable media of claim 12, wherein:
the first compute engine comprises a first workflow architecture, wherein the first workflow architecture comprises a first threshold for workflow throughout and a first threshold for a number of workflows;
wherein the second compute engine comprises a second workflow architecture, wherein the second workflow architecture comprises a second threshold for workflow throughout and a second threshold for the number of workflows, wherein the second threshold for workflow throughput is higher than the first threshold for workflow throughput, and wherein the second threshold for the number of workflows is lower than the first threshold for the number of workflows; and
wherein the third compute engine comprises the second workflow architecture.

19. The one or more non-transitory computer-readable media of claim 12, wherein the first dataset maintains the first on-chain data as the hexadecimal encoded data while in the first format, and wherein the second dataset does not maintain the first on-chain data as the hexadecimal encoded data while in the second format.

20. The one or more non-transitory computer-readable media of claim 12, wherein the instructions further cause an operation comprising:
designating a first blockchain node of a plurality of blockchain nodes for the blockchain network as having a first node type; and
based on designating the first blockchain node of the plurality of blockchain nodes as having the first node type, establishing a session with the first blockchain node.

* * * * *